(12) United States Patent
Kitahara et al.

(10) Patent No.: US 12,487,099 B2
(45) Date of Patent: Dec. 2, 2025

(54) MAP SERVER AND MAP DISTRIBUTION METHOD

(71) Applicant: DENSO CORPORATION, Kariya (JP)

(72) Inventors: Genki Kitahara, Kariya (JP);
Tomohito Terazawa, Kariya (JP);
Yasuhiko Mukai, Kariya (JP)

(73) Assignee: DENSO CORPORATION, Kariya (JP)

( * ) Notice: Subject to any disclaimer, the term of this patent is extended or adjusted under 35 U.S.C. 154(b) by 297 days.

(21) Appl. No.: 18/179,164

(22) Filed: Mar. 6, 2023

(65) Prior Publication Data

US 2023/0204386 A1 Jun. 29, 2023

Related U.S. Application Data

(63) Continuation of application No. PCT/JP2021/032443, filed on Sep. 3, 2021.

(30) Foreign Application Priority Data

Sep. 9, 2020 (JP) .................................. 2020-151419

(51) Int. Cl.
*G01C 21/00* (2006.01)
*B60W 60/00* (2020.01)
*G01C 21/32* (2006.01)

(52) U.S. Cl.
CPC ..... *G01C 21/3896* (2020.08); *B60W 60/0015* (2020.02); *G01C 21/32* (2013.01);
(Continued)

(58) Field of Classification Search
CPC ................. G01C 21/3896; G01C 21/32; G01C 21/3807; G01C 21/3811; B60W 60/0015;
(Continued)

(56) References Cited

U.S. PATENT DOCUMENTS 9,665,100 B2 5/2017 Shashua et al.
2007/0075919 A1* 4/2007 Breed ................. B60R 21/0132
345/8
(Continued)

FOREIGN PATENT DOCUMENTS

JP 4631682 B2 11/2010
JP 2013-152383 A 8/2013
(Continued)

*Primary Examiner* — Anne Marie Antonucci
*Assistant Examiner* — Luis G Del Valle
(74) *Attorney, Agent, or Firm* — Maschoff Brennan

(57) ABSTRACT

A map server includes a difficult place setting unit, a distribution map generation unit, and a distribution processing unit. The difficult place setting unit identifies, based on a cancel point report from a vehicle, a difficult place which is a point where vehicle control involving a driving support or automatic driving is highly likely cancelled. The distribution map generation unit generates, as a map of a difficult place area related to the difficult place, distribution maps respectively including map information denser than a map of a normal area that is an area other than the difficult place area. The distribution maps of the normal area, which does not include detailed map information, contributes to a reduction of data amount in an entire map distribution scheme, when, for example, distributing map data over the network.

17 Claims, 15 Drawing Sheets

(52) U.S. Cl.
CPC ..... *G01C 21/3807* (2020.08); *B60W 2556/40* (2020.02); *B60W 2556/50* (2020.02)

(58) Field of Classification Search
CPC .......... B60W 2556/40; B60W 2556/50; G08G 1/09; G09B 29/00
See application file for complete search history.

(56) References Cited

U.S. PATENT DOCUMENTS

| | | | | |
|---|---|---|---|---|
| 2016/0305794 | A1* | 10/2016 | Horita | G06V 20/584 |
| 2017/0010618 | A1* | 1/2017 | Shashua | G01C 21/3644 |
| 2019/0250620 | A1* | 8/2019 | Huang | G05D 1/0061 |
| 2020/0326702 | A1* | 10/2020 | Iwamoto | B60T 7/16 |
| 2021/0182575 | A1 | 6/2021 | Murakami | |
| 2021/0318138 | A1 | 10/2021 | Muto | |
| 2021/0341940 | A1* | 11/2021 | Baik | G01C 21/3896 |
| 2022/0067813 | A1* | 3/2022 | Beaurepaire | G01C 21/3484 |
| 2022/0289201 | A1* | 9/2022 | Nordbruch | B60W 40/04 |

FOREIGN PATENT DOCUMENTS

| | | | | |
|---|---|---|---|---|
| JP | 2018-510373 A | | 4/2018 | |
| JP | 2019169068 A | * | 10/2019 | ............. F16D 23/14 |

\* cited by examiner

| Fd1 | Fd2 | Fd3 | Fd4 | Fd5 | Fd6 | |
|---|---|---|---|---|---|---|
| | | | | | OPTN | |
| ID1 | ID2 | T. Num | No | STD | OBJ | TRJ |

| Fd1 | Fd2 | Fd3 | Fd4 | Fd5 |
|---|---|---|---|---|
| ID1 | Null | Null | Null | STD |

MAP SERVER AND MAP DISTRIBUTION METHOD

CROSS REFERENCE TO RELATED APPLICATIONS

This application is a continuation application of International Patent Application No. PCT/JP2021/032443 filed on Sep. 3, 2021, which designated the U.S. and claims the benefit of priority from Japanese Patent Application No. 2020-151419 filed on Sep. 9, 2020. The entire disclosure of all of the above application is incorporated herein by reference.

TECHNICAL FIELD

The present disclosure relates to technology for reducing the cost of map data communication.

BACKGROUND

In a prior art, a technique for generating map data including information is disclosed, and the map data includes the information on landmarks that are land objects and/or features existing along a road, based on probe data including position information on landmarks and the like detected using images captured by a vehicle-mounted camera. The map data is used for performing vehicle control according to a current position in a vehicle that autonomously travels along a lane.

Scenes or situations may include difficult places, in which it is difficult to autonomously travel only with a surrounding monitoring sensor include, for example, intersections on general roads, junctions/merges on expressways and the like.

SUMMARY

According to one aspect of the present disclosure, a map server for distributing map data to a plurality of vehicles includes: a report reception unit receiving cancel point reports from the vehicles, each of the cancel point reports being a data set indicative of a point where the predetermined vehicle control for supporting a driving operation by a user or for autonomously driving the vehicle is canceled; a difficult place setting unit setting, based on the cancel point reports received by the report reception unit from the vehicles, a difficult place on a map where it is difficult to perform the predetermined vehicle control while maintaining a certain performance level; a distribution map generation unit generating distribution map data for each of plurality of areas defined on the map, the plurality of areas including a difficult place area including the difficult place and a normal area that is not the difficult place area; and a distribution process unit performing a process for distributing the map data generated by the distribution map generation unit to the vehicles. The difficult place setting unit is configured to determine whether a target point is the difficult place based on both a number of receptions of the cancel point reports from the vehicles at the target point and road structure data regarding the target point. The distribution map generation unit is configured to generate, for the difficult place area, as the distribution map data, a data set having a greater amount of data for each unit area or for each unit road length than a data set generated for the normal area.

DESCRIPTION OF EMBODIMENTS

Figure 1:
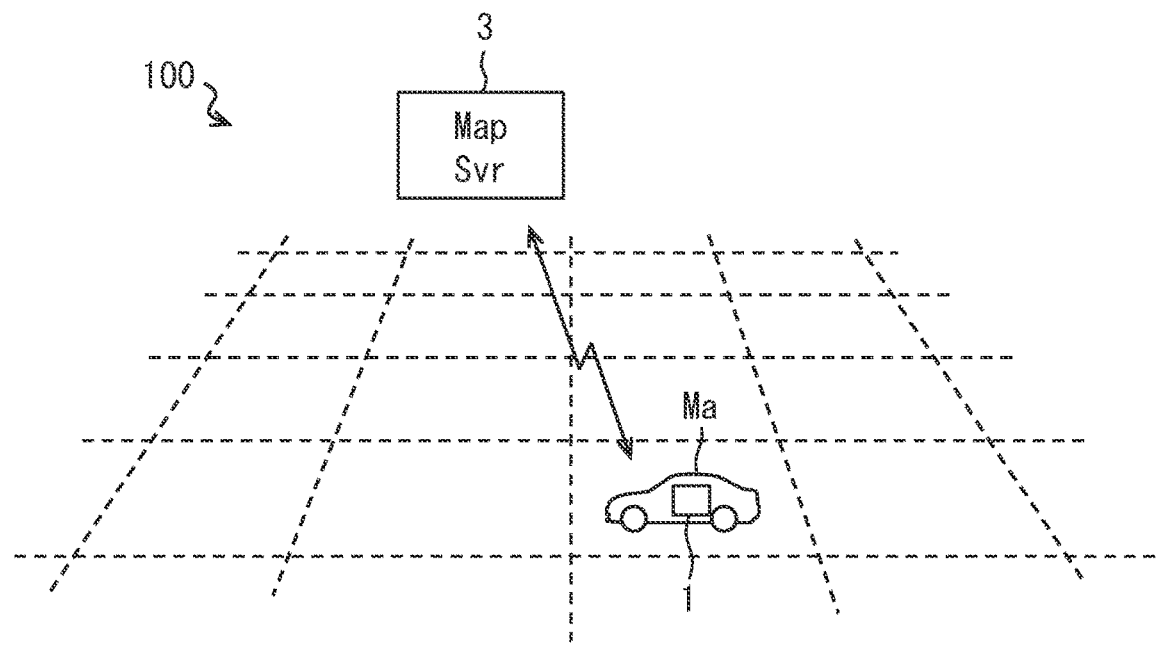
FIG. 1 is a diagram for explaining an overview of a map-linked system.

To begin with, a relevant technology will be described first only for understanding the following embodiments. In scenes or situations where complex determinations and controls are required, the continuity of automatic driving functions and advanced driving support functions (hereinafter referred to as automatic driving, etc.) deteriorates, i.e., are not maintainable, only with the surrounding monitoring sensor. If automatic driving and the like is frequently interrupted, the user's convenience is reduced. In addition, if automatic driving and the like is frequently interrupted, there is concern that it will be difficult for users to develop a sense of trust in the system. Therefore, there is a demand to reduce the possibility of cancellation of automatic driving and the like by introducing detailed map data that describes the positions and shapes of various features in detail.

However, increasing the amount of information of the map data increases the amount of communication between the server and the vehicle when distributing the map. If the amount of communication increases, the cost borne by the user in terms of communication fees may also increase. Also, as the amount of information in the map data increases, so does the amount of communication within the vehicle, thereby it is necessary to upgrade the communication device and communication facility. Therefore, the cost ultimately borne by the user may increase.

It is an object of the present disclosure, based on such situation, to provide a map server, a map distribution method, a map data structure, and a vehicle device capable of reducing the cost of map data communication while reducing the risk of cancelling vehicle control.

In a first aspect of the present disclosure, a map server for distributing map data to a plurality of vehicles. The map server includes: a report reception unit receiving cancel point reports from the vehicles, each of the cancel point reports being a data set indicative of a point where the predetermined vehicle control for supporting a driving operation by a user or for autonomously driving the vehicle is canceled; a difficult place setting unit setting, based on the cancel point reports received by the report reception unit from the vehicles, a difficult place on a map where it is difficult to perform the predetermined vehicle control while maintaining a certain performance level; a distribution map generation unit generating distribution map data for each of plurality of areas defined on the map, the plurality of areas including a difficult place area including the difficult place and a normal area that is not the difficult place area; and a distribution process unit performing a process for distributing the map data generated by the distribution map generation unit to the vehicles. The difficult place setting unit is configured to determine whether a target point is the difficult place based on both a number of receptions of the cancel point reports from the vehicles at the target point and road structure data regarding the target point. The distribution map generation unit is configured to generate, for the difficult place area, as the distribution map data, a data set having a greater amount of data for each unit area or for each unit road length than a data set generated for the normal area.

In a second aspect of the present disclosure, a map distribution method for distributing map data to a plurality of vehicles. The method is performed by at least one processor and includes the steps of: receiving cancel point reports from the vehicles, each of the cancel point reports being a data set indicative of a point where the predetermined vehicle control for supporting a driving operation by a user or for autonomously driving the corresponding vehicle is canceled; setting, based on the cancel point reports received from the vehicles, a difficult place on a map where it is difficult to perform the predetermined vehicle control while maintaining a certain performance level; generating distribution map data for each of plurality of areas defined on the map, the plurality of areas including a difficult place area including the difficult place and a normal area that is not the difficult place area; and performing a process for distributing the generated map data to the vehicles. The step of setting the difficult place further includes determining whether a target point is the difficult place based on both a number of receptions of the cancel point reports from the vehicles at the target point and road structure data regarding the target point. The step of generating the distribution map further includes generating, for the difficult place area, as the distribution map data, a data set having a greater amount of data for each unit area or for each unit road length than a data set generated for the normal area.

In a third aspect of the present disclosure, a map server for distributing map data to a vehicle includes: a difficult place setting unit setting a difficult place on a map where it is difficult to perform a predetermined vehicle control for supporting a driving operation by a user or for autonomously driving the vehicle while maintaining a certain performance level; a distribution map generation unit generating distribution map data for a plurality of areas defined on the map, the plurality of areas including a difficult place area including the difficult place and a normal area that is not the difficult area; and a distribution process unit performing a process for distributing the map data generated by the distribution map generation unit to the vehicle. The distribution map generation unit is configured to generate, for the difficult place area, as the distribution map data, a data set having a greater amount of data for each unit area or for each unit road length than a data set generated for the normal area. The map data for the difficult place area includes information on at least two landmarks within 30 meters, and the map data for the normal area includes information on no more than one landmark within 30 meters.

In a fourth aspect of the present disclosure, a map distribution method for distributing map data to a vehicle includes the steps of: setting a difficult place on a map where it is difficult to perform a predetermined vehicle control for supporting a driving operation by a user or for autonomously driving the vehicle while maintaining a certain performance level; generating distribution map data for each of a plurality of areas defined on the map, the plurality of areas including a difficult place area including the difficult place and a normal area that is not the difficult place area; and performing a process for distributing the map data generated in the distribution map generation step to the vehicle. The step of generating the distribution map further includes generating, for the difficult place area, as the distribution map data, a data set having a greater amount of data for each unit area or for each unit road length than a data set generated for the normal area. The map data for the difficult place area includes information on at least two landmarks within 30 meters, and the map data for the normal area includes information on no more than one landmark within 30 meters.

According to the above configuration, for areas related to difficult places (that is, for the difficult place area), map data having a greater amount of information than other areas is distributed.

Furthermore, a map data structure for achieving the above object is a structure for distributing map from the map server as map data of a map used by a processor that performs a predetermined vehicle control for supporting the user's driving operation or for autonomously driving the vehicle, and the map data structure has: a first data field in which position information is inserted for a difficult place, which is a point on the map where it is difficult to perform vehicle control while maintaining a certain level of performance; and a second data field in which information about map elements used by the processor to generate a control plan at the difficult place is inserted.

According to the map data having the above data structure, the processor provided in the vehicle plans the vehicle control using map information for performing the vehicle control in difficult places stored in the second field. As a configuration of the map data, a data field for storing the information of the points that are not the difficult place is an optional element, thereby such a data field is omissible. Therefore, it is possible to reduce the cost of sending and receiving map data while reducing the possibility of cancellation of the vehicle control.

Next, an embodiment of a vehicle control system 1 according to the present disclosure will be described with reference to the drawings. In the following description, an example of left-side traffic, where the vehicle control system 1 is used in a region where left-side traffic is legally enforced, will be described. A right turn at an intersection hereinafter refers to a behavior of crossing over an oncoming lane and entering an intersecting road. In addition, among lanes having the same traveling direction, a leftmost lane is referred to as the first lane. In regions where right-side traffic is legal, left-right in the following description can be reversed as appropriate. The present disclosure can be appropriately modified and performed so as to comply with local laws and customs in which the vehicle control system 1 is used. For example, the mode of vehicle control for turning right or left at an intersection can be changed so as to comply with the traffic rules and regulations of the region where the vehicle control system 1 is used.

<Overview of Overall Configuration>

FIG. 1 is a diagram showing an example of a schematic configuration of a map-linked system 100 including the vehicle control system 1 according to the present disclosure. As shown in FIG. 1, the map-linked system 100 includes the vehicle control system 1 built in a vehicle Ma and a map server 3. Although only one vehicle Ma having the vehicle control system 1 is shown in FIG. 1, a plurality of vehicles Ma equipped with the vehicle control system 1 may exist in the illustrated scheme. That is, there may be a plurality of vehicles Ma that configure the map-linked system 100.

The vehicle control system 1 can be mounted on various vehicles Ma that is capable of traveling on a road. The vehicle Ma may be a four-wheeled vehicle, as well as a two-wheeled vehicle, a three-wheeled vehicle, or the like. Motorized bicycles may also be included in two-wheeled vehicles. The vehicle Ma may be an owner's car owned by an individual, or may be a vehicle served as a one in a car sharing service or a vehicle rental service (so-called rental car). Also, the vehicle Ma may be a service car. Service cars include taxis, fixed-route buses, shared buses, and the like. The taxi/bus may be a robot taxi/driverless bus, etc., with no driver on board.

A subject vehicle in the present disclosure refers to one vehicle Ma on which the vehicle control system 1 is installed. Also, the user refers to an occupant sitting on the driver's seat of the subject vehicle (that is, an occupant on the driver's seat). The concept of a driver's seat occupant can also include an operator, an entity that has the authority to remotely control the subject vehicle. In the following description, each of longitudinal, lateral, and vertical directions is defined with reference to the subject vehicle. Specifically, the longitudinal direction corresponds to a longitudinal direction of the subject vehicle. The lateral direction corresponds to a width direction of the subject vehicle. The up-down direction corresponds to a height direction of the subject vehicle. From another standpoint, the upward and downward directions correspond to directions perpendicular to a plane parallel to the forward and rearward directions and the leftward and rightward directions.

By performing wireless communication with the map server 3, the vehicle control system 1 downloads partial map data, which is local high-definition map data, from the map server 3, and uses it for driving support, automatic driving, and navigation.

<About Map Data>

First, the map data managed and distributed by the map server 3 will be described. The map data corresponds to map data that indicates a road structure, position coordinates of the features arranged along the road, and the like with accuracy that can be used for automatic driving. Map data comprises road network data, lane network data, feature data, static POI data, and dynamic POI data. Each data is hierarchically organized.

Figure 2:
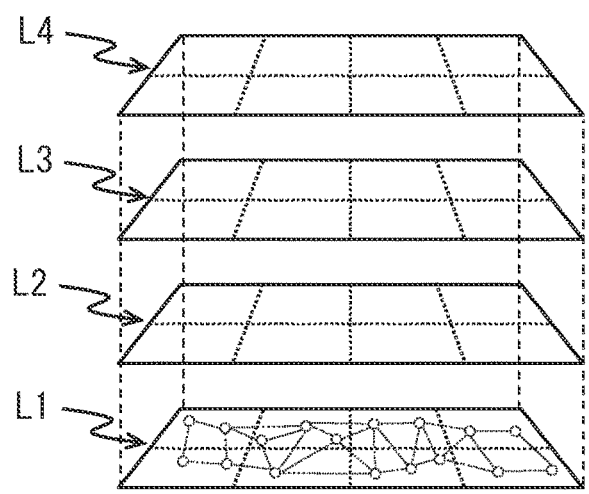
FIG. 2 is a diagram for explaining a configuration of map data.

For example, map data includes a network layer L1, a feature layer L2, a static POI layer L3, and a dynamic POI layer L4 containing dynamic POI data, as shown in FIG. 2. The network layer L1 is a layer that accommodates the road network data and the lane network data. The feature layer L2 is a layer that stores the feature data. The static POI layer L3 is a layer that accommodates the static POI data. The dynamic POI layer L4 is a layer that accommodates the dynamic POI data.

The road network data held in the network layer L1 includes link data for each road link and node data for each node. A node is a point set on a road to represent a connection relationship between roads, such as a point where a road diverges/merges or an end of a road. A road link indicates a road section connecting between nodes. Link data for each road link includes link ID, link length, number of lanes, road attributes, and connection node information (e.g., node ID). Node data for each road node includes a node ID, position coordinates, and connection link information (for example, link ID). Road attributes include, for example, road name, road type, road width, lane number information representing the number of lanes, and speed limit value. The link data may also include data indicating the road type, such as whether the road is a motorway dedicated for motor vehicles only or a general (i.e., local) road. The motorway here refers to a road on which the pedestrian or the bicycle is prohibited from entering, such as a toll road, e.g., an expressway. The link data may include attribute information indicating whether or not the road permits automatic driving, in other words, automatic driving.

The lane network data includes lane link data for each lane link and lane node data for each lane node. Lane link data includes lane ID, link ID at lane level, link length, and connection node information. Lane node data includes node IDs, location coordinates, and connection link information at the lane level. The link information at the lane level included in the lane network data is associated with the road link included in the road network data.

The feature data held in the feature layer L2 includes road edge data, road marking data, and three-dimensional object data. The various feature data can be data on features that is detectable by a camera as a surrounding monitoring sensor 11, which will be described later. The road edge data includes coordinate points indicating the position of the road edges.

The road marking data is data indicating positions and types of road markings on a road surface. A road marking is a piece of paint on a road surface (e.g., pavement) for the purpose of regulating or directing traffic on the road. In one aspect, road markings can be referred to as a road surface paint. For example, road markings include lane division lines indicating lane boundaries, pedestrian crossings, stop lines, driving lanes, safety zones, and control arrows. Road markings can also include a road surface paint that indicates a road name. Lines, symbols, and characters provided on the road surface correspond to road markings. Road markings can include not only paint, but also different colors of the road surface itself, lines, symbols, and characters formed by road studs, stones, and the like.

The road marking data includes lane marking data, which is data about lane division lines, and interspersed road marking data, which is data about other road markings. While the lane marking data is data about linear markings that continuously extends along the road, the interspersed road marking data is data of road marking that is interspersedly positioned at required places such as stop lines and speed limit markings. The interspersed road marking data indicate positions and types of predetermined road markings other than lane markings.

The lane marking data is data about lane division lines. Lane division lines also include those realized by road studs such as Chatterbars and Bots Dots. The lane marking data include a lane marking ID for each lane marking and a coordinate point group representing an installation portion. The lane marking data includes pattern information such as broken lines, solid lines, and road tracks. The lane division lines are also called lane marks or lane markers. In the following description, the term "division line" refers to a boundary line between lanes. The lane markings can include road perimeter lines, center lines, and the like. The road edge data and lane marking data are associated with lane information such as lane IDs and lane-level link IDs, for example. The position and shape information of road edges and lane markings may be represented by quadratic or cubic spline curves.

The three-dimensional object data represents the positions and types of three-dimensional structures installed along the roads. Three-dimensional structures installed along the roads include, for example, traffic signs, commercial signboards, poles, guardrails, curbs, trees, utility poles, and traffic signals. A traffic sign refers to a signboard provided with at least one of a symbol, a character string, and a pattern that act as, for example, a regulatory sign, a guide sign, a warning sign, an instruction sign, or the like. The guide sign includes direction signboards, area name signboards indicating area names, road name signboards indicating road names, and notice signboards for notifying entrances and exits of expressways, service areas, and the like. The shape and position of each three-dimensional structure are represented, for example, by a coordinate point group. Some or all of the above structures installed along the road and predetermined road markings such as stop lines are used as landmarks, which will be described later. In other words, the map data includes data on installation positions and types of landmarks.

The static POI data held in the static POI layer L3 is data regarding static map elements other than the above. A static map element here refers to a feature that is required to be updated within one week or so, for example. In other words, a static map element refers to a map element whose position or state of existence does not change at least for several minutes to several hours. The static POI data includes location information such as toll gates, tunnels, branch points for exiting from a expressway main line, and merging points. In addition, map elements such as a curve start position where a curve section starts, a lane change start position for exiting from the main line to a deceleration lane, and a lane change start position for merging from an acceleration lane to the main line may also be included in the map elements serving as the static POIs. Each static POI data includes type and location information. Static POI data can be, for example, data about static map elements that are not included in detection targets of the surrounding monitoring sensor 11, which will be described later.

The dynamic POI data held in the dynamic POI layer L4 is data indicating positions of dynamic map elements. A dynamic map element refers to a map element whose position or state of existence changes as time changes from several minutes to several hours. Dynamic map elements include, for example, congested sections, construction sections, broken-down vehicles, fallen objects, accident locations, lane restriction sections, and the like. Heavy rain areas where localized heavy rain occurs, frozen road sections where the road surface is frozen, snow-covered areas where the road surface is covered with snow, and sand-covered areas where the road is covered with sand can also be included in dynamic map elements. The sand-covered area refers to a point on a paved road with lane markings where the lane markings are temporarily covered with sand (i.e., are not viewable) due to a sandstorm or the like. Dynamic POI data and static POI data indicating the positions and types of features and events that affect vehicle travel plans may be appendable to the data generated based on the probe data, by specific post-processing performed by a server or by an operator.

Figure 3:
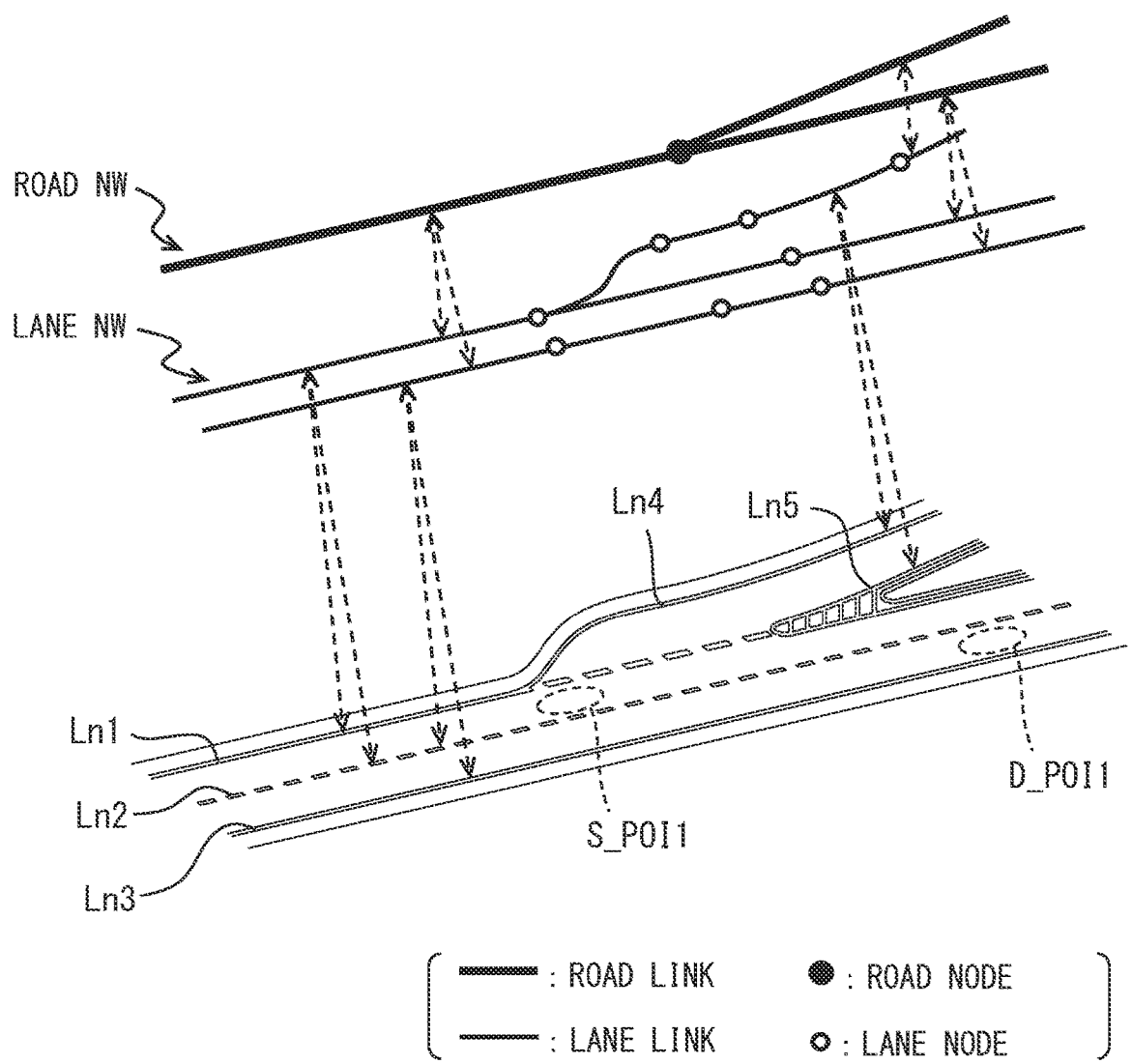
FIG. 3 is a diagram for explaining a correspondence relationship between layers of map data.

The various layers described above are associated with each other by position coordinates and the like. FIG. 3 conceptually shows connections between map elements held in each layer. Ln1 to Ln5 shown in FIG. 3 represent lane markings represented by feature data. S_POI1 represents, as a static POI, a lane change start position for exiting to a deceleration lane, for example. D_POI1 represents, as a dynamic POI, a stop position of a broken-down vehicle, for example.

The above map data may be three-dimensional map data including point groups of characteristic points of road shapes and structures. The three-dimensional map data corresponds to map data representing the positions of features such as road edges, lane markings, and traffic signs in three-dimensional coordinates. Note that the three-dimensional map may be generated based on captured images by REM (Road Experience Management). The layer configuration of the map data is one example and can be changed as appropriate. For example, the static POI layer L3 and the feature layer L2 may be merged. Moreover, the map data need not include all of the map elements exemplified above, in other words, all of the map items. The map data may include only some of the map elements exemplified above.

Furthermore, the map data may include a travel track model. The travel track model is track data generated by statistically integrating travel loci of a plurality of vehicles. The travel track model is, for example, an average of travel loci for respective lanes. The travel track model corresponds to data indicating a travel track that serves as a reference when steering assistance is performed or automatic driving is performed. Note that the steering assist function is sometimes called LTA (Lane Tracing Assist) or LTC (Lane Trace Control). LTA and LTC correspond to vehicle control as driving support for driving the subject vehicle along a lane or a trajectory of a preceding vehicle. The steering assist function hereinafter can be performed by replacing it with LTA or LTC. The map data may comprise a travel track layer containing travel track models.

Furthermore, the map data includes, as the static POI layer L3 or other layers, travelable range data that indicates a travelable range when the vehicle actually travels on a road using the automatic driving function or the driving support function. The travelable range data is generated, for example, in a form of polygon data. The travelable range data indicates a travelable range for each of the traveling directions, for example, in a junction section or branch section on an expressway or the like, in an intersection, at a no-lane point, or the like. A no-lane point refers to a point where there is no paint or road studs indicating lane markings. The travelable range can also be understood as an area in which the vehicle can travel or an area in which the vehicle should travel. A method of setting the travelable range will be described separately later.

The map server 3 has full map data corresponding to the entire map recording area. However, all map data is divided into multiple patches and managed and distributed. Each patch corresponds to map data for different areas. For example, the map server 3 manages the entire map recording area in units of rectangular map tiles each having a side length of about 100 m to 300 m. Map tiles correspond to the subordinate concept of the patch described above. Each map tile is provided with information indicating a real-world region to which the map tile corresponds. Information indicating a real-world region is represented by, for example, latitude, longitude, and altitude. Each map tile is given a unique tile ID. The map data for each patch or each map tile is part of the entire map recording area, in other words, local map data. A map tile corresponds to partial map data. The map server 3 can distribute partial map data corresponding to the position of the vehicle control system 1 based on a request from the vehicle control system 1.

Note that the shape of the map tile is not limited to a rectangular shape of several hundred meters square. A rectangular shape of 500 m square, 1 km square, or 2 km square may also be used. Further, the map tile may be hexagonal or circular. Each map tile may be set to partially overlap with adjacent map tiles. That is, each map tile may be set to overlap other map tiles near the boundary. In addition, the manner in which the map data is divided may be defined by the data size. In other words, the map data covering the entire map recording area may be divided and managed within a range defined by the data size. In such case, each patch is set so that the amount of data is less than a predetermined value. According to such an aspect, the data size in one distribution can be set to a certain value or less. The map recording area may be the entire country where the vehicle is used, or may be only a part of the area. For example, the map recording area may be only an area where automatic driving of general vehicles is permitted or an area where automatic driving travel service is provided.

The map data described above is updated at any time by, for example, integrating probe data uploaded from a plurality of vehicles. The map data handled by the map server 3 of the present embodiment is a probe data map (hereinafter referred to as a PD map) generated and updated by integrating probe data observed by a plurality of vehicles, but is not limited to such data. The map data handled by the map server 3 is data measured by dedicated probe cars equipped with high-resolution LiDAR, high-precision maps generated based on fixed-point survey results, high-precision GPS survey results, etc. (hereinafter referred to as an HD map). LiDAR stands for Light Detection and Ranging/Laser Imaging Detection and Ranging.

<About the Configuration of the Vehicle Control System 1>

Figure 4:
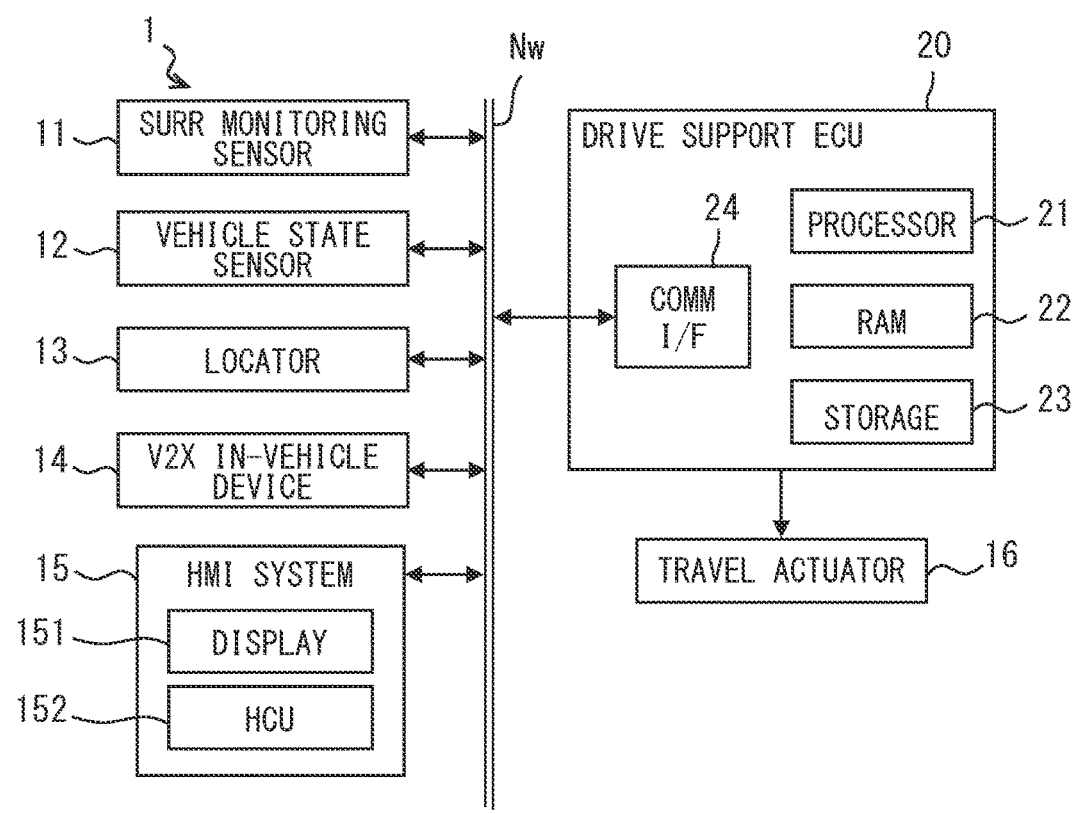
FIG. 4 is a diagram for explaining a configuration of a vehicle control system.

The vehicle control system 1 includes the surrounding monitoring sensor 11, a vehicle state sensor 12, a locator 13, a V2X in-vehicle device 14, an HMI system 15, a travel actuator 16, and a drive support ECU 20, as shown in FIG. 4. The ECU in the above naming is an abbreviation for electronic control unit and means an electronic control device. The HMI is an abbreviation for human machine interface. The V2X is an abbreviation for vehicle to x (everything) and refers to a communication technology that connects various things to a vehicle. Note that the "V" of V2X may refer to an automobile as the subject vehicle, and the "X" may refer to various presences other than the subject vehicle, such as a pedestrian, other vehicles, a road facility, a network, a server and the like.

The various devices or sensors constituting the vehicle control system 1 are connected as nodes to an in-vehicle network Nw, which is a communication network built in the vehicle. Nodes connected to the in-vehicle network Nw can communicate with each other. Note that specific devices may be configured to be able to communicate directly with each other without going through the in-vehicle network Nw. Although the in-vehicle network Nw is configured as a bus type in FIG. 4, it is not limited to such a configuration. The network topology may be a mesh type, a star type, a ring type, or the like. Various standards such as Controller Area Network (CAN is a registered trademark), Ethernet (registered trademark), and FlexRay (registered trademark) can be adopted as the standard of the in-vehicle network Nw.

The surrounding monitoring sensor 11 is a sensor that monitors the surroundings of the vehicle. The surrounding monitoring sensor 11 is configured to detect the presence and position of a predetermined detection target. The surrounding monitoring sensor 11 corresponds to a sensor (so-called autonomous sensor) that directly acquires physical information such as light and sound and detects an object within a predetermined detection range. Objects to be detected include, for example, pedestrians and moving objects such as other vehicles. Other vehicles include a bicycle, a motorized bicycle, or a motorcycle. Further, the surrounding monitoring sensor 11 is configured to be able to detect a predetermined feature. Features to be detected by the surrounding monitoring sensor 11 include road edges, median strips, road markings, and three-dimensional structures installed along roads. As described above, the road markings are lane markings, stop lines, and the like. Three-dimensional structures installed along roads are, for example, road signs and traffic signals. Some or all of the features that are detected by the surrounding monitoring sensor 11 are used as landmarks in the drive support ECU 20.

A landmark in the present disclosure refers to a feature that can be used as a landmark for identifying the position of the vehicle on the map. As a landmark, at least one of signboards corresponding to traffic signs such as regulatory signs and information signs, traffic signals, poles, information boards, stop lines, and lane markings can be adopted. Among the landmarks, a feature that can be used as a mark for estimating a position in a longitudinal direction (hereinafter referred to as longitudinal position estimation) is also referred to as a landmark for longitudinal position estimation. The longitudinal direction here corresponds to a front-rear direction of the vehicle. Further, the longitudinal direction corresponds to a road extending direction, which is a direction in which the road extends as viewed from the vehicle, in a straight road section. As landmarks for longitudinal position estimation, it is possible to employ map elements discretely arranged along roads, e.g., traffic signs such as direction signboards and road markings such as stop lines. A feature that can be used as a landmark for estimating the position in a lateral direction of the vehicle (hereinafter, lateral position estimation) is also referred to as a landmark for lateral position estimation. The lateral direction here corresponds to the width direction of the road. Landmarks for lateral position estimation refer to features that exist continuously along the road, such as road edges and lane markings.

Landmarks hereinafter mainly refer to features that can be used as landmarks for estimating the longitudinal position of a vehicle. Of course, as mentioned above, the concept of landmarks can include lane markings and the like. The types of features used as landmarks can be changed as appropriate.

As landmarks, map elements such as traffic signs and road markings that change little over time are suitable. The surrounding monitoring sensor 11 may be configured to be capable of detecting a feature of the type set as the landmark.

The surrounding monitoring sensor 11 may be configured to detect obstacles such as fallen objects from other vehicles. The obstacle here refers to a three-dimensional object that exists on the road and obstructs the passage of vehicles. Obstacles include tires detached from the vehicle body, vehicles in accidents, fragments of vehicles in accidents, boxes, ladders, bags, skis, and the like falling from traveling vehicles. Obstacles can also include regulatory materials and equipment for lane regulation, construction sites, and parked vehicles. The regulatory materials and equipment are, for example, arrow boards, cones, guide boards, and the like.

As the surrounding monitoring sensor 11, for example, a surrounding monitoring camera, millimeter wave radar, LiDAR, sonar, etc. can be adopted. The surrounding monitoring camera is an in-vehicle camera arranged to capture an image in a predetermined direction outside the subject vehicle. The surrounding monitoring camera is, for example, a front camera arranged at an upper end of a windshield on an interior side of the vehicle or at a front grill so as to capture an image of the front of the vehicle. Of course, the vehicle control system 1 may be provided with a rearward camera, a right-side camera, a left side camera, etc. as surrounding monitoring cameras. Surrounding monitoring cameras and LiDARs detect the above-described detection target using a recognition device which uses, for example, a CNN (Convolutional Neural Network) or a DNN (Deep Neural Network).

Note that an object recognition process based on the observation data generated by the surrounding monitoring sensor 11 may be performed by an ECU provided outside the sensor, such as the drive support ECU 20. In other words, the drive support ECU 20 may have part or all of the object recognition function of the surrounding monitoring sensor 11 such as the front camera or the millimeter wave radar. In such case, the various surrounding monitoring sensors 11 provide the drive support ECU 20 with observation data such as image data and distance measurement data as detection result data.

The vehicle state sensor 12 is a group of sensors that detect state quantities related to travel control of the subject vehicle. The vehicle state sensor 12 refers to, for example, a vehicle speed sensor, a steering sensor, an acceleration sensor, a yaw rate sensor, and the like. The vehicle speed sensor detects a speed of the subject vehicle. The steering sensor detects a steering angle of the subject vehicle. The acceleration sensor detects an acceleration in a front-rear direction of the subject vehicle and an acceleration in a left-right direction of the subject vehicle. The yaw rate sensor detects an angular velocity of the subject vehicle. The type of sensor used by the vehicle control system 1 as the vehicle state sensor 12 may be appropriately designed, and it is not necessary to include all the sensors described above. Further, the vehicle state sensor 12 can include, for example, a rain sensor that detects rainfall and an illuminance sensor that detects outside brightness.

The locator 13 is a device that generates highly accurate positional information and the like of the subject vehicle by composite positioning that combines a plurality of pieces of information. The locator 13 is implemented as, for example, a GNSS receiver. A GNSS receiver is a device that sequentially detects the current position of the GNSS receiver by receiving navigation signals transmitted from positioning satellites that constitute a GNSS (Global Navigation Satellite System). For example, when the GNSS receiver can receive navigation signals from four or more positioning satellites, it outputs positioning results every 100 milliseconds. As the GNSS, a GPS, a GLONASS, a Galileo, an IRNSS, a QZSS, a Beidou, and the like can be adopted.

The locator 13 sequentially locates the position of the vehicle by combining the positioning result of the GNSS receiver and the output of the inertia sensor. For example, the locator 13 performs dead reckoning (that is, autonomous navigation) using the yaw rate and vehicle speed when the GNSS receiver cannot receive the GNSS signal, such as in a tunnel. The locator 13 may perform dead reckoning using the output of an acceleration sensor or a gyro sensor. The determined vehicle position information is output to the in-vehicle network Nw and is used by the drive support ECU 20 and the like. A part of the functions of the locator 13 may be included in the drive support ECU 20.

The V2X in-vehicle device 14 is a device for performing wireless communication between the subject vehicle and other devices. The V2X in-vehicle device 14 includes a wide area communication unit and a short range communication unit as communication modules. The wide area communication unit is a communication module for performing wireless communication compliant with a predetermined wide area wireless communication standard. Various standards such as LTE (Long Term Evolution), 4G, and 5G can be adopted as the wide area wireless communication standard here. Such a V2X in-vehicle device 14 can also be called as a DCM (Data Communication Module), a TCU (Telematics Control Unit), or the like. The wide area communication unit may be configured to perform wireless communication directly with other devices (in other words, without going through the base station) by a method compliant with the wide area wireless communication standard, in addition to communication via a wireless base station. That is, the wide area communication unit may be configured to perform cellular V2X. By installing the V2X in-vehicle device 14, the subject vehicle becomes a connected car that can be connected to the Internet. For example, the drive support ECU 20 can cooperate with the V2X in-vehicle device 14 to download and use high-precision map data corresponding to the current position from a map server.

The short range communication unit provided in the V2X in-vehicle device 14 is a communication module for performing wireless communication directly with other moving objects or road side devices around the subject vehicle, by using a short range communication standard, which is a communication standard that limits the communication distance to be within several hundred meters. The other moving objects are not limited to the vehicle, but may include the pedestrian, the bicycle, and the like. Any standards such as WAVE (Wireless Access in Vehicular Environment) disclosed in IEEE 1609 and DSRC (Dedicated Short Range Communications) can be used as the short range communication standard.

The HMI system 15 is a system that provides an input interface function of receiving a user operation and an output interface function of presenting information to the user. The HMI system 15 has a display 151 and an HCU (HMI Control Unit) 152. In addition to the display 151, a speaker, a vibrator, an illumination device (for example, an LED), or the like can be employed as means for presenting information to the user.

The display 151 is a device that displays images. The display 151 is, for example, a so-called center display that is provided at an uppermost portion of the vehicle width direction central portion of an instrument panel. The display 151 is capable of displaying full-color image, and can be realized using a liquid crystal display, an OLED (Organic Light Emitting Diode) display, a plasma display, or the like. The display 151 may be a head-up display that projects a virtual image on a portion of the windshield in front of the driver's seat. Also, the display 151 may be a meter display.

The HCU 152 is a configuration to comprehensively control information presentation to the user. The HCU 152 is realized by using, for example, a processor, RAM (Random Access Memory), flash memory, and the like. A processor refers to, for example, a CPU (Central Process Unit) or a GPU (Graphics Process Unit). The HCU 152 controls the display screen of the display 151 based on information provided from the drive support ECU 20 and signals from an input device (not shown). For example, the HCU 152 displays on the display 151 an icon image indicating an execution state of drive support based on the drive support ECU 20 or a request from the drive support ECU 20. Note that a medium for presenting information to the user is not limited to the display 151. The HCU 152 may be configured to present information to the user using a speaker or the like.

The travel actuators 16 are actuators for traveling. The travel actuator 16 includes, for example, a brake actuator as a braking device, an electronic throttle, a steering actuator, and the like. Steering actuators also include EPS (Electric Power Steering) motors. The travel actuator 16 is controlled by the drive support ECU 20. Between the drive support ECU 20 and the travel actuator 16, other ECUs such as a steering ECU that performs steering control, a power unit control ECU and a brake ECU that perform acceleration/deceleration control may be interposed.

The drive support ECU 20 is an ECU that supports the driving operation of the driver's seat occupant based on the detection result of the surrounding monitoring sensor 11. For example, the drive support ECU 20 controls the travel actuator 16 based on the detection result of the surrounding monitoring sensor 11, thereby performing part or all of the driving operation on behalf of the driver's seat occupant. The drive support ECU 20 may be an automatic driving device that causes the subject vehicle to autonomously travel based on a user's input of an autonomous travel instruction. The drive support ECU 20 corresponds to a device that executes a predetermined automatic control function that automatically performs some or all of the driving tasks. Note that the driving task here includes, for example, steering operation and acceleration/deceleration operation. Further, the driving task also includes monitoring the surroundings of the vehicle, for example, in front of the vehicle.

The drive support ECU 20 is mainly composed of a computer including a processor 21, a RAM 22, a storage 23, a communication interface 24, and a bus connecting them. The processor 21 is hardware for a calculation process combined with the RAM 22. The processor 21 is configured to include at least one arithmetic core such as a CPU or the like. The processor 21 can also be called as a process circuit module. The processor 21 executes various processes by accessing the RAM 22. The storage 23 includes a non-volatile storage medium, such as a flash memory or the like. A drive support program is stored in the storage 23 as a program executed by the processor 21. Execution of the program by the processor 21 corresponds to execution of a drive support method as a method corresponding to the drive support program. The communication interface 24 is a circuit for communicating with other devices via the in-vehicle network Nw. The communication interface 24 may be implemented by using an analog circuit element, an IC, or the like. The drive support ECU 20 corresponds to a vehicle device.

<Drive Support ECU 20>

Figure 5:
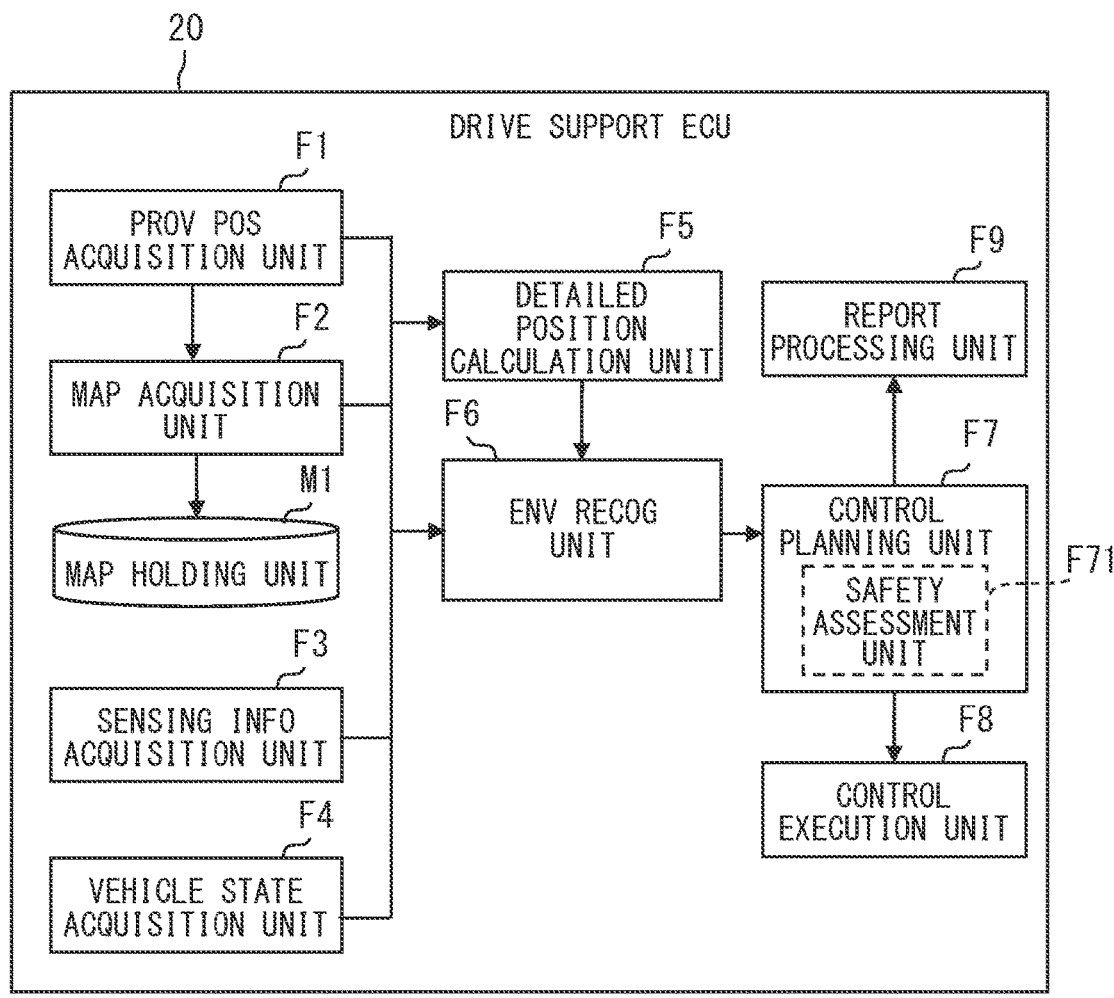
FIG. 5 is a block diagram showing a configuration of a drive support ECU.

Here, the functions and operations of the drive support ECU 20 will be described with reference to FIG. 5. The drive support ECU 20 provides functions corresponding to various functional blocks shown in FIG. 5 by performing the drive support program stored in the storage 23. That is, the drive support ECU 20 includes, as functional units, a provisional position acquisition unit F1, a map acquisition unit F2, a sensing information acquisition unit F3, a vehicle state acquisition unit F4, a detailed position calculation unit F5, an environment recognition unit F6, a control planning unit F7, a control execution unit F8 and a report processing unit F9.

The provisional position acquisition unit F1 acquires position information of the subject vehicle from the locator 13. Also, the provisional position acquisition unit F1 is capable of performing dead reckoning based on the output of a yaw rate sensor or the like, with the position calculated by the detailed position calculation unit F5, which will be described later, as a starting point. Note that the provisional position acquisition unit F1 may have the function of the locator 13.

The map acquisition unit F2 wirelessly communicates with the map server 3 via the V2X in-vehicle device 14 to acquire map data corresponding to the current position of the subject vehicle. For example, the map acquisition unit F2 requests the map server 3 for partial map data related to roads that the subject vehicle is scheduled to pass within a predetermined time, and acquires the partial map data from the map server 3. The partial map data acquired from the map server 3 is stored in, for example, the map holding unit M1. The map holding unit M1 is implemented by using part of the storage area of the storage 23 or the RAM 22, for example. The map holding unit M1 is implemented by using a non-transitory, substantial storage medium.

As the current position used when acquiring the map, the position identified by the provisional position acquisition unit F1 or the detailed position calculation unit F5 can be adopted. For example, when the detailed position calculation unit F5 has already calculated the current position, map data is acquired by using the position information. On the other hand, when the detailed position calculation unit F5 has not yet calculated the current position, map data is acquired by using the position coordinates acquired by the provisional position acquisition unit F1. Note that the vehicle control system 1 may include an in-vehicle storage device that stores map data. In such case, the map acquisition unit F2 can be configured to sequentially read the map data around the current position from the in-vehicle storage device. That is, the map data acquired by the map acquisition unit F2 may be locally stored in the subject vehicle or may be stored on the cloud. The concept of locally stored map data can include cached map data.

The sensing information acquisition unit F3 acquires the detection result (that is, sensing information) of the surrounding monitoring sensor 11. The sensing information includes the positions and movement speeds of other moving bodies, features, obstacles, and the like existing around the subject vehicle. For example, it includes (i) the distance between (a) the forward vehicle in front, which is a vehicle traveling in front of the subject vehicle, and (b) the subject vehicle, and (ii) the moving speed of the vehicle in front. The forward vehicle here can include a so-called preceding vehicle that travels in the same lane as the subject vehicle, as well as a vehicle that travels in an adjacent lane. In other words, the forward direction here is not limited to the direction directly in front of the subject vehicle, but can include the diagonally forward direction.

Furthermore, the sensing information acquisition unit F3 acquires the relative positions and types of landmarks from the surrounding monitoring sensor 11 such as a front camera or the like. The sensing information acquisition unit F3 converts the relative position coordinates of the landmarks acquired from the surrounding monitoring sensor 11 into position coordinates (hereinafter also referred to as observation coordinates) in the global coordinate system. Observation coordinates of landmarks are calculated, for example, by combining the current position coordinates of the subject vehicle and relative position information of the feature relative to the subject vehicle. Note that the camera ECU 41 may calculate the observation coordinates of the landmark by using the current position coordinates of the subject vehicle. Further, the sensing information acquisition unit F3 may convert the relative position information of the lane markings and the like into position coordinates in the global coordinate system, similarly to the landmarks. The data acquired by the sensing information acquisition unit F3 is output to the detailed position calculation unit F5, the environment recognition unit F6, and the like.

The vehicle state acquisition unit F4 acquires travel speed, acceleration, yaw rate, traveling direction, time information, weather, illuminance outside the vehicle, wiper operation speed, and the like from the vehicle state sensor 12 and the like via the in-vehicle network Nw. The vehicle state acquisition unit F4 also acquires operation information of AEB (Automatic Emergency Braking), an output signal of a collision sensor, and the like. In other words, the vehicle state acquisition unit F4 can acquire various information related to the behavior of the subject vehicle that flows through the in-vehicle network Nw.

When the map acquisition unit F2 has already acquired map data including information on lane markings and landmarks, the detailed position calculation unit F5 performs, based on the map data and landmark information acquired by the sensing information acquisition unit F3, a localization process. The localization process refers to a process of identifying the detailed position of the subject vehicle, by collating (i) the position of a landmark or the like identified based on an image captured by an in-vehicle camera serving as the surrounding monitoring sensor 11 with (ii) the position coordinates of features registered in the map data. The localization process may include at least one of, for example, (i) a longitudinal position estimation process that estimates a position in the longitudinal direction of the vehicle using landmarks such as direction signboards, and (ii) a lateral position estimation process that estimates of a lateral position of the road using observation coordinates such as lane markings and road edges.

As the longitudinal position estimation process, the detailed position calculation unit F5 associates the landmarks registered on the map with the landmarks observed by the surrounding monitoring sensor 11 based on the observation coordinates of the landmarks. For example, among the landmarks registered on the map, the landmark closest to the observation coordinates of the landmark is estimated as the one being observed. Note that, in landmark matching, it may be preferable to identify a landmark having a high degree of matching in, for example, feature amounts such as shape, size, color and the like. After completing the association between the observed landmarks and the landmarks on the map, the position of the subject vehicle on the map is set as a position which is identified with reference to the landmark, i.e., by longitudinally shifting the positions of the landmark on the map with a distance between the observed landmark and the subject vehicle.

For example, as a result of image recognition, in a situation where the distance to the direction signboard existing in front of the subject vehicle is identified as 40 meters, it is determined that the subject vehicle exists at a position which has position coordinates shifted by 40 meters backward, i.e., reversed in the traveling direction, from the position coordinates of the direction signboard registered in the map data. The longitudinal position estimation corresponds to a process for identifying the position of the subject vehicle in the road extending direction. Longitudinal position estimation can also be called as a longitudinal localization process. By estimating a longitudinal position in such manner, it becomes possible to identify detailed remaining distances to characteristic points on the road, e.g., POIs, such as intersections, curve entrances/exits, tunnel entrances/exits, tail end of traffic jams, and the like.

When the detailed position calculation unit F5 detects a plurality of landmarks in front of the subject vehicle, the detailed position calculation unit F5 uses the landmark closest to the subject vehicle to estimate the longitudinal position. As for the recognition accuracy of the type and distance of an object based on an image or the like, the closer the object is to the vehicle, the higher the recognition accuracy becomes. In other words, the position estimation accuracy is improvable by estimating the longitudinal position using the landmark closest to the subject vehicle from among the plurality of detected landmarks.

Further, as a more preferable aspect, the detailed position calculation unit F5 of the present embodiment is configured to execute the longitudinal position estimation process using landmarks existing within a predetermined reference distance, for example, in order to ensure position estimation accuracy. The reference distance can be, for example, 40 meters. The reference distance may also be 30 meters or 50 meters. Moreover, when the surrounding monitoring sensor 11 is equipped with a telephoto camera, the reference distance may be 100 meters or the like. The reference distance may be set based on the recognition distance of the surrounding monitoring sensor 11, the angle of view, and the like.

Further, the detailed position calculation unit F5 identifies the lateral position of the subject vehicle with respect to the road based on the distances from the left and right road edges/lane markings recognized by the surrounding monitoring sensor 11 with the lateral position estimation process. For example, if the distance from the left side of the road to the center of the vehicle is identified as 1.75 meters as a result of image analysis, it is determined that the subject vehicle is located 1.75 meters to the right of the coordinates of the left side edge of the road. Lateral position estimation can also be referred to as a lateral localization process. Based on the distance from the left and right road edges/lane markings recognized by the surrounding monitoring sensor 11, the detailed position calculation unit F5 may identify a traveling lane ID, which is an identifier of the lane in which the vehicle is traveling. The traveling lane ID indicates, for example, which lane (e.g., first, second or the like) the subject vehicle is traveling from the left end or right end of the road. Further, the detailed position calculator F5 may identify the detailed position of the subject vehicle in the traveling lane, e.g., an amount of offset in the left and right direction from the center of the lane, based on the distance from the left and right lane markings recognized by the surrounding monitoring sensor 11, for example.

The position of the subject vehicle as a result of the localization process may be expressed in the same coordinate system as map data, such as latitude, longitude, and altitude. The vehicle position information can be expressed in any absolute coordinate system such as WGS84 (World Geodetic System 1984).

The detailed position calculation unit F5 sequentially performs the localization process at a predetermined position estimation cycle. The default value of the position estimation cycle may be 200 milliseconds or 400 milliseconds. For example, the detailed position calculation unit F5 sequentially performs longitudinal position estimation process at the position estimation cycle as long as landmarks are recognizable (in other words, captured). Even when the landmarks are not recognizable, the detailed position calculation unit F5 sequentially performs the lateral position estimation process at the position estimation cycle as long as at least one of the lane marking and the road edge is recognized.

Note that each time the detailed position calculation unit F5 executes the localization process, the detailed position calculation unit F5 calculates a vehicle position error, which is the difference between (a) the current position output as a result of the localization process performed this time and (b) the position calculated by the provisional position acquisition unit F1 by dead reckoning or the like. For example, when the detailed position calculation unit F5 calculates, as the vehicle position error, the difference between (a) the vehicle position coordinates calculated by the provisional position acquisition unit F1 and (b) the result of the localization process, when the localization process is performed by using a landmark that is different from the one used in the last time. The vehicle position error tends to increase as a period during which the localization cannot be performed increases. During a period in which the localization process cannot be performed, a provisional vehicle position error is calculated by multiplying a lapse time or a travel distance from the time when the localization process was lastly performed by a predetermined error estimation coefficient. Such a vehicle position error can also be called as an error assessment value. The vehicle position error calculated by the detailed position calculation unit F5 is output to the environment recognition unit F6 and to the control planning unit F7.

The environment recognition unit F6 recognizes travel environment, which is the surrounding environment of the subject vehicle, based on the recognition result of the surrounding monitoring sensor 11 acquired by the sensing information acquisition unit F3. For example, the environment recognition unit F6 recognizes the travel environment of the subject vehicle by a sensor fusion process that integrates the detection results of the various surrounding monitoring sensors 11 with a predetermined weight according to a travel scene or the like. The travel environment here includes not only static environmental elements such as the current position, traveling lane, road type, speed limit, and relative positions such as traffic signals, but also the position and speed of other moving objects, the shape of surrounding objects and size, and the like. In addition, the environment recognition unit F6 may acquire traffic information and weather information from the map server 3, other centers, roadside devices, etc. via the V2X in-vehicle device 14. The traffic information includes information on the presence or absence of congested road sections, road construction information, traffic regulation information, speed limit, and road surface conditions. The weather information includes temperature, humidity, weather, amount of precipitation, wind speed, wind direction, and the like.

The control planning unit F7 uses the travel environment recognized by the environment recognition unit F6 and the map data to generate a vehicle control plan for supporting the user's driving operation. The vehicle control in the present disclosure can be read as a travel control in one aspect. For example, the control planning unit F7 generates a control plan for traffic signal passage support. Traffic signal passage support is a vehicle control that supports the driving operation when passing through a road on which a traffic signal is installed. Traffic signal passage support includes an automatic brake control for stopping in front of a traffic signal. For example, when it is confirmed that a traffic signal exists in front of the subject vehicle based on the map data or the result of image recognition by the front camera, the control planning unit F7 generates a vehicle control plan according to the signaling state of the traffic signal. For example, when the remaining distance to the traffic signal is less than 70 meters and the traffic signal is red, a travel plan is generated to decelerate the vehicle so as to stop the vehicle at a predetermined distance before the traffic signal. It should be noted that the front side here corresponds to the direction opposite to the traveling direction of the vehicle.

The content of the control plan for the traffic signal in front of the vehicle is generated based on the prediction result of the signaling state of the traffic signal when the vehicle reaches a predetermined distance (for example, 100 meters or 50 meters) from the traffic signal. The traffic signal passage support may be a process of notifying the user of the existence of the traffic signal and the signaling state of the traffic signal in cooperation with the HMI system 15. The control plan for traffic signal passage support may be generated and modified based on not only the signaling state of traffic signals for vehicles, but also the signaling state of traffic signals for pedestrians. The control plan for traffic signal passage support may be updated as required based on changes in the signaling state of the traffic signal. Even if the remaining distance to the traffic signal is less than a predetermined support cancellation threshold, in case that a lighting device corresponding to the traffic signal shown in the map data cannot be identified by image recognition, it is determined that the traffic signal passage support is cancelled, and a new plan is generated as a plan to notify the user of such situation.

Also, the control planning unit F7 generates a control plan for realizing the steering assist function. For example, a planned travel track along the subject vehicle's travel lane is generated, and steering amounts and steering speeds at a plurality of points in time are planned for the subject vehicle to travel along the planned travel track. The planned travel track may be the center of the travel lane or may be a track along a travel track model. The planned travel track may include a lane change. Further, the planned travel track may include a track for exiting from a high-speed main lane to the deceleration lane and a track for joining the high-speed main lane from the acceleration lane. Since the deceleration lane and the acceleration lane are lanes attached to the main line, they can also be called as attached lanes.

Furthermore, the control planning unit F7 may generate a control plan for right turn support. Right turn support is a vehicle control for supporting the driving operation when turning right at an intersection. The right turn support can be a vehicle control that decelerates the vehicle to stop at a predetermined right turn waiting position based on the position of an oncoming vehicle identified by the front camera, a side camera, LiDAR, or the like. In such case, the control planning unit F7 plans a deceleration schedule for stopping at the right turn waiting position based on the position of the oncoming lane. The right turn waiting position is a place where oncoming vehicles do not pass, and can be just inside the center of the intersection. More specifically, it can be in front of the diamond-shaped road marking placed in the center of the intersection.

Note that the right turn support can be a vehicle control that (i) generates a track in the intersection based on the recognition result of the surrounding monitoring camera and (ii) autonomously turns the vehicle to the right along the track. The track in the intersection may be generated based only on the detection results of the surrounding monitoring sensor 11. Further, when track determination data for each of the traveling directions in an intersection has already been acquired as map data from the map server 3, a control plan may be generated based on the map data. If there is a pedestrian crossing ahead of the right turn, the right turn support can include a vehicle control that identifies the timing at which the vehicle can turn right based on the pedestrian crossing situation at the pedestrian crossing, and notifies the user of such timing.

Also, the control planning unit F7 may generate a control plan for left turn support. Left turn support is a vehicle control for supporting the driving operation when turning the vehicle to the left at the intersection. Left turn support can be a vehicle control that decelerates the vehicle to temporarily stop in front of the pedestrian crossing based on the pedestrian crossing situation identified by the front camera, the side camera, LiDAR, or the like. In such case, the control planning unit F7 plans a deceleration schedule based on the position of the pedestrian crossing.

Furthermore, when it is confirmed that an obstacle exists in front of the vehicle based on the detection result of the surrounding monitoring sensor 11 or the map data while traveling on a road section other than the intersection, the control planning unit F7 may generate a travel plan that passes by the side of the obstacle. Such a travel plan may include acceleration/deceleration schedule information for speed adjustment on a calculated route. The vehicle control planned by the control planning unit F7 may be limited to supporting the driving operation, or may allow the subject vehicle to travel autonomously. The control planning unit F7 may be configured to generate a plurality of control plans, and may select the most reasonable control plan from among them as a final execution plan from the viewpoint of safety.

The traffic signal passage support, steering support, drive support or automatic driving for right and left turns, avoidance of obstacles, and the like described above correspond to the automatic control function. Further, the traffic signal passage support, steering support, drive support for turning left or right or automatic driving, avoidance of obstacles, etc., correspond to the vehicle control for supporting the user's driving operation or for allowing the vehicle to travel autonomously. The automatic control function can be called as a vehicle control application, which is an application that executes a vehicle control. When the control planning unit F7 decides to cancel the automatic control function that is being performed or scheduled to be performed, the control planning unit F7 notifies the report processing unit F9 of such decision together with the reasons.

Note that conditions for canceling a vehicle control application such as steering support can be defined for each of different kinds of the vehicle control application or for each of different kinds of an in-vehicle equipment. For example, regarding steering support, it may be cancelled in a rainy weather, or when a road surface friction coefficient is a predetermined threshold value or less, or when the lane marking detection rate or an effective recognition distance is less than a predetermined threshold value due to puddles, rain, snow, fog, dust, or the like. In addition, steering support may also be cancelled in sections where lane restrictions are being performed due to construction or the like, or in sections where temporary/special lanes are provided. Alternatively, steering support may be cancelled as exceeding a system limitation if the curvature is above a predetermined threshold or at points where the road slope changes sharply. As specific examples of cancellation of the automatic control function, specific examples of report events are adoptable.

By the way, when the drive support ECU 20 provides an automatic driving function, the control planning unit F7 preferably includes a safety assessment unit F71 as one aspect. Note that the safety assessment unit F71 is an optional element and can be omitted.

The safety assessment unit F71 is a configuration to assess the safety of the control plan generated by the control planning unit F7 based on the travel environment recognition result of the environment recognition unit F6 and the map data, and to determine a final execution plan. For example, the safety assessment unit F71 assesses safety based on whether or not an inter-object distance, which is a distance between the subject vehicle and an object existing around the subject vehicle, is equal to or greater than a safety distance determined using a mathematical formula model that formulates the concept of safe driving. Specifically, the safety assessment unit F71 determines a potential accident liability value that indicates a degree of liability of the subject vehicle in a situation of having an accident for the subject vehicle in each of a plan candidate planned by the control planning unit F7. The potential accident liability value is determined using, as one of the factors, a result of comparison between an inter-vehicle distance and a safety distance between the subject vehicle and a surrounding vehicle when the subject vehicle travels according to the plan candidate.

The potential accident liability value is a parameter that takes a smaller value as the liability lowers. Therefore, the potential accident liability value becomes a smaller value as the subject vehicle drives more safely. For example, when a sufficient inter-vehicle distance is reserved, the potential accident liability value becomes a small value. Also, the potential accident liability value can become a large value when the subject vehicle suddenly accelerates or decelerates. Note that map data is used to calculate safety distance based on road structures and traffic rules, and to calculate potential accident liability values.

The safety assessment unit F71 can set the potential accident liability value to a low value when the subject vehicle is traveling according to the traffic rules. In other words, whether or not the planned travel track of the subject vehicle complies with traffic rules can also be used as a factor that affects the potential accident liability value. In order to determine whether the subject vehicle is traveling according to the traffic rules, the safety assessment unit F71 can have a configuration for acquiring the traffic rules of the point where the subject vehicle is traveling. The traffic rules for the location where the vehicle is traveling may be acquired from a predetermined database, or may be acquired by analyzing the image captured by the camera that captures the surroundings of the vehicle to detect signs, traffic signals, road markings, or the like. Traffic rules may be included in map data.

The safety distance used by the safety assessment unit F71 is a parameter that serves as a reference for assessing safety between the subject vehicle and a target such as a preceding vehicle, and is dynamically determined according to the travel environment. The safety distance is set based on at least behavior information such as acceleration of the subject vehicle or the like. Since various models can be adopted as a method for calculating the safety distance, detailed description of the calculation method is omitted here. As a mathematical formula model for calculating the safety distance, for example, an RSS (Responsibility Sensitive Safety) model can be used. Moreover, SFF (Safety Force Field, registered trademark) can also be adopted as a mathematical formula model for calculating the safety distance. As the safety distance, there is a safety distance from the preceding vehicle, that is, a longitudinal safety distance, and a left-right direction, that is, a lateral safety distance. The mathematical formula model described above includes models for determining these two types of safety distances.

The above mathematical formula model is not a model that guarantees that no accident will occur, but a model that guarantees that the driver is free from responsibility of an accident as long as taking an appropriate action for avoiding collision when the inter-vehicle distance falls short of the safety distance. An example of appropriate action for collision avoidance as used herein is braking with a reasonable force. Braking with a reasonable force includes, for example, braking at the maximum deceleration that the subject vehicle can exhibit. The safety distance calculated by the mathematical formula model can be rephrased as the minimum distance that the vehicle should keep between itself and the obstacle in order to avoid close encounter of the vehicle and the obstacle.

The safety assessment unit F71 selects a final execution plan from among a plurality of control plans based on the potential accident liability value for each control plan. For example, the safety assessment unit F71 adopts a plan with the smallest potential accident liability value or a plan with an acceptable level of potential accident liability value among the control plans generated by the control planning unit F7 as the final execution plan.

The control execution unit F8 is a configuration to output a control signal corresponding to the control plan determined by the control planning unit F7 to the travel actuator 16 and/or the HCU 152 which are control targets. For example, when deceleration is scheduled, it outputs a control signal for realizing the planned deceleration to the brake actuator or an electronic throttle. For example, the control execution unit F8 causes the subject vehicle to travel along the center of the lane by generating a steering force in the direction toward the center of the lane. Further, it outputs control signals to the HCU 152 for outputting images and sounds indicating the execution states of various driving support functions.

The report processing unit F9 is a configuration to generate a predetermined cancel point report and to output it to the V2X in-vehicle device 14 based on an occurrence of a predetermined report event. The cancel point report output to the V2X in-vehicle device 14 is processed into communication packets and is uploaded to the map server 3.

The report event is an event that indicates that an automatic control function that has been performed or has been scheduled to be performed is cancelled. The report event can have contents, for example, that a vehicle control application for the steering support or automatic driving has been cancelled due to system determination. Specifically, it can be determined that a report event has occurred when a handover request process due to system limitation is performed. The handover request process, in conjunction with the HMI system 15, corresponds to requesting the driver's seat occupant or the operator to take over the driving operation. A situation of accepting the system limitation means, for example, an occasion of when (i) the vehicle position error exceeds a predetermined threshold value, or (ii) when an abnormality is detected in a part of the surrounding monitoring sensor 11, or (iii) when a control plan with the potential accident liability value having a predetermined threshold value or less is not calculable or the like.

Also, if a planned lane change could not be performed due to surrounding traffic conditions, the system-determined automatic driving could be cancelled. For example, in a situation in which the subject vehicle is planning to go straight through an intersection, if the autonomous sensor recognizes that the vehicle is traveling in a left-turn only lane, the system plans to change lanes to the one that allows straight travel. However, if there is not enough vacant space in the lane to change to, the planned lane change cannot be performable. In such a case, automatic driving may be cancelled as a system limitation. Similarly, when changing lanes from the acceleration lane to merge with the main road, or when changing lanes from the main road to the deceleration lane or entering another expressway, the lane change may fail due to the lack of vacant space.

Further, the report event may also include that the automatic driving has been cancelled due to user intervention. Specifically, when the user performs a steering operation or a braking operation during automatic driving, that is, when an override is performed, such an event can be included in the report event. The report event may be an event that MRM (Minimum Risk Maneuver) has been performed. MRM refers to a vehicle control that stops, for example, the subject vehicle in a safe place or within a traveling lane while gradually decelerating by issuing an alarm to the surroundings. The report event may include an event that the AEB has been activated.

Further, it is also possible to adopt, as a report event, detection of user intervention in steering during an execution of steering support. Regarding the traffic signal passage support, an event in which the lighting device corresponding to the traffic signal cannot be identified by image recognition at a position where the remaining distance to the installation position of the traffic signal registered on the map is less than a predetermined value may also be included in the report event. The fact that a collision sensor senses an impact equal to or greater than a predetermined threshold value, or that the output value of an acceleration sensor or a yaw rate sensor becomes equal to or greater than a predetermined threshold value can also be used as report events.

The cancel point report is a data set used for reporting to the map server 3 a point at which the automatic control function has been cancelled due to system determination or user intervention. The cancel point at which the automatic control function is cancelled can also be understood as data indicating a point at which there is difficulty in performing or continuing the automatic control function, or, in other words, a difficult point in control.

Hereinafter, a difficult point at which it is difficult to perform the automatic control function while maintaining a certain level of performance may also be referred to as a high-difficulty level point or a difficult place. The certain level mentioned here can be rephrased as a predetermined allowable level or a normal level. In addition, performance can be translated into quality or control margins. A case of a certain level of performance not maintainable means, for example, a situation where deceleration, lateral acceleration, or yaw rate exceeding a predetermined allowable threshold occurs. That is, a case where abrupt braking or abrupt steering is performed corresponds to an example of a case where a certain level of performance cannot be maintained. In addition, states or situations where it is not possible to maintain a certain level of performance include, for example, situations where, without appropriate reasons, a travel speed of the vehicle is lowered to a value lower than a certain standard speed, such as waiting at traffic signals, traffic jams, turning right or left at intersections, waiting for pedestrians to cross the street or the like. The standard speed may be a speed limit, or may be an average value of the travel speeds of surrounding, nearby vehicles. Also, the predetermined amount here can be 15 km/h or the like. On the other hand, a state in which a certain level of performance is maintained includes, for example, a state in which control stability similar to that acquired when traveling in a section on an expressway where the curvature and gradient are less than a predetermined threshold value. That is, in other words, a difficult place can be interpreted as a point where vehicle control has higher difficulty level than a straight section of the road on an expressway where the curvature and gradient are less than a predetermined threshold value.

Such a difficult place includes, for example, points with certain geographic conditions that make it difficult to perform the automatic control function. The geographic conditions here also include road structural conditions such as the gradient and curvature of the road, the type of road, the number of lanes, the presence or absence of lane markings, and the clarity of road edges. Further, the difficult place also includes points where dynamic environmental conditions such as weather and fallen objects make it difficult to continue performing the automatic control function at a certain level of performance.

A difficult place can also be interpreted in one aspect as a point at which it is difficult to execute or continue a given automatic control function, or in other words, a point at which the automatic control function is highly likely to be cancelled. For example, a difficult place can include points where the automatic control function may be interrupted with a certain probability or higher. Further, a difficult place may be points at which temporary system responses to increase safety should be performed, such as reducing the travel speed by a predetermined amount or reducing the travel speed down to a predetermined value. The description of a difficult place can be read as a caution point. A difficult place, according to yet another aspect, corresponds to a point at which map data support is required in performing or continuing the automatic control function. Specifically, although automatic driving is continuable, it can be interpreted as a point where more precise automatic driving should be performed with the support of map data.

There are various factors such as the road structure, dynamic map elements, traffic volume, performance of the surrounding monitoring sensor 11 itself, and the like as reasons for causing the difficulty described above or the like. Examples of difficult places and their reasons will further be described later.

A cancel point report can be, for example, a data set including source information and report point information. The report point information is information indicating which point the report is reporting about. For example, the report point information is set with the position coordinates of the point where the automatic control function was cancelled. The source information can be a unique identification number assigned to the subject vehicle. The cancel point report may include the reason why the automatic control function was cancelled. The reason the automatic control function was cancelled may indicate whether it was a system determination or a user determination. If the system determines to cancel the automatic control function, it is preferable to include a specific reason for the determination, such as failure to recognize a lane marking or road edge, failure to recognize a traffic signal, or exceeding a vehicle position error threshold. The reason for the determination may be a failure to recognize a stop line in front of a traffic signal, a failure to identify a right turn waiting position in an intersection, a failure to make a planned lane change, or the like.

In addition to the above, the cancel point report preferably includes the type of the cancelled application and the version information of the software being used as the information on the cancelled automatic control function. According to such a configuration, the map server 3 can identify the difficult point for each of the applications and/or each of the versions based on the report from the vehicle. Furthermore, the cancel point report may include information about the type and model of the surrounding monitoring sensor 11 mounted on the subject vehicle. According to such a configuration, the map server 3 can identify a difficult place for each of the different kinds of the in-vehicle equipment based on a report from the vehicle. Further, the cancel point report may also include information indicative of the vehicle model. The vehicle model includes conceptually, for example, car model, model year, and grade. According to such a configuration, the map server 3 can identify the difficult places for each of the vehicle models based on the report from the vehicle. Further, the cancel point report may also include information such as version information of a preventive safety package installed in the vehicle. According to such a configuration, the map server 3 can identify the difficult places for each of the versions of the preventive safety package.

<Operation Flow of the Drive Support ECU 20>

Figure 6:
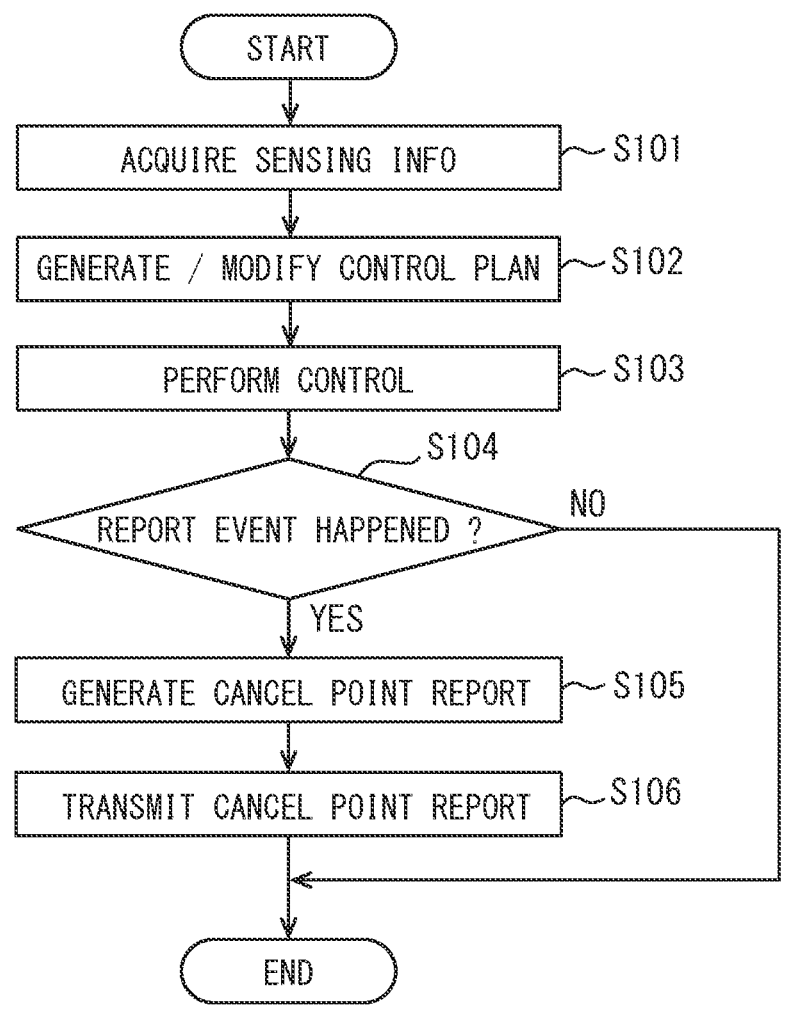
FIG. 6 is a flowchart of a difficult place reporting process performed by the drive support ECU.

Next, a difficult place reporting process performed by the drive support ECU 20 will be described with reference to a flowchart shown in FIG. 6. The flowchart shown in FIG. 6 is performed at predetermined intervals (for example, every 200 milliseconds) while the electric power source for a travel of the vehicle is being turned on. The electric power source for a travel of the vehicle is, for example, a power supply to an ignition in an internal-combustion engine vehicle. In an electric vehicle, a system main relay corresponds to the electric power source for a travel of the vehicle. In the present embodiment, as an example, the difficult place reporting process includes steps S101 to S106. Note that the flow described here may be performed on condition that a predetermined automatic control function is set to be performable based on a user's operation. Alternatively, it may be performed on condition that a transmission of the cancel point report is enabled based on the user's operation. It should be noted that the number of steps and the process procedure included in the difficult place reporting process can be changed as appropriate.

In addition, the detailed position calculation unit F5 of the drive support ECU 20 independently performs, in other words, in parallel and in sequence, performs the localization process, from the flowchart shown in FIG. 6. If the landmark for longitudinal position estimation cannot be recognized, the detailed position calculation unit F5 can estimate the longitudinal position based on, for example, the vehicle speed, a wheel speed or the like. By performing the localization process, the detailed position of the subject vehicle on the map is determined.

First, in step S101, the sensing information acquisition unit F3 acquires sensing information from the various surrounding monitoring sensors 11, and the process proceeds to step S102. In step S102, the control planning unit F7 generates or corrects a control plan for the automatic control function based on the sensing information acquired in step S101, and proceeds to step S103. As described above, other vehicle information acquired by inter-vehicle communication can also be used when generating or modifying a control plan. Further, the sensing information acquired in step S101 may be reflected in the control plan after being processed by sensor fusion or the like by the environment recognition unit F6. In step S103, the control execution unit F8 outputs a control signal corresponding to the planned control contents to the travel actuator 16 and the like, and the process proceeds to step S104.

In step S104, the report processing unit F9 determines whether or not the above-described report event has occurred based on the vehicle state such as the acceleration acquired by the vehicle state acquisition unit F4 and the notification from the control planning unit F7. If a report event has already occurred, an affirmative decision is made in step S104 and the process proceeds to step S105. On the other hand, if the report has not yet occurred, a negative decision is made in step S104, and the flow comes to an end.

In step S105, the report processing unit F9 generates the above-described cancel point report, and proceeds to step S106. In step S106, the report processing unit F9 cooperates with the V2X in-vehicle device 14, transmits the cancel point report generated in step S105 to the map server 3, and ends this flow.

<Supplement to Report Processing Unit F9>

The report processing unit F9 may be configured to sequentially transmit to the map server 3, as probe data, a data set indicating an observation position of the feature identified by the environment recognition unit F6. The probe data corresponds to packaged data of recognition results within a certain period of time (for example, 400 milliseconds) for lane markings, landmarks, and the like.

The probe data includes, for example, the source information, travel track information, travelling road information, and feature information. The travel track information is information indicating the track on which the subject vehicle has traveled. For example, the travel track information is expressed as a sequence of points of the subject vehicle position. The travelling road information is information indicating a road on which the subject vehicle is traveling, by using a track of the road edges and a track of the center line. The edge of the travelling road and the like may also be represented by a coordinate point group. Note that the travel track information and the traveling road information may be represented by a cubic spline curve. Further, the travel track information and the traveling road information may be represented by coefficient parameters indicating a regression equation of detection points. The regression equation is a function corresponding to a straight line or curve that approximately represents the distribution of a plurality of detection points, and is calculated by, for example, the least squares method.

The feature information indicates observation coordinates of features such as lane markings, landmarks and the like. In one aspect, the feature information and the travel track information included in the probe data correspond to information for the map server 3 to generate and update static maps.

The report processing unit F9 transmits the probe data as described above to the map server 3 in cooperation with the V2X in-vehicle device 14. The generation and transmission of probe data by the report processing unit F9 is performed spontaneously or based on an instruction from the map server 3.

The probe data may include vehicle behavior information such as the vehicle speed, the steering angle, the yaw rate, blinker operation information, wiper operation information and the like. Further, when an obstacle such as a fallen object or a parked vehicle is being detected, the report processing unit F9 may upload probe data including the observed position of the obstacle. According to such a configuration, the map server 3 can update the status of existence, such as occurrence or disappearance, of dynamic map elements included in the dynamic POI layer L4 based on the reports from the vehicles.

<Configuration of the Map Server 3>

Figure 7:
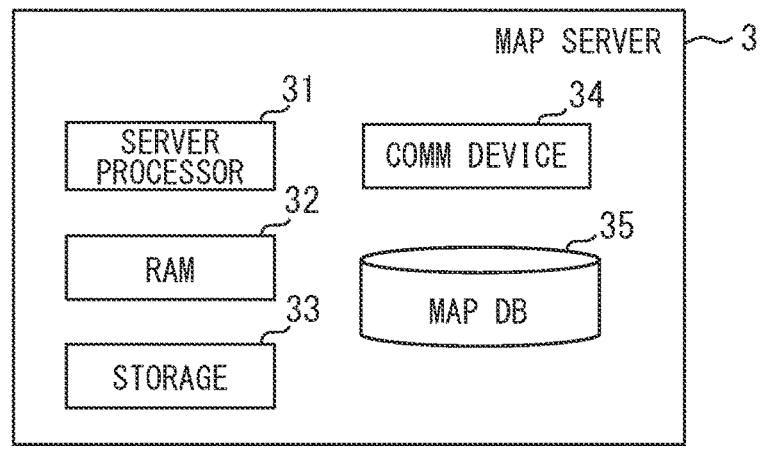
FIG. 7 is a diagram showing a configuration of a map server.

The map server 3 includes a server processor 31, a RAM 32, a storage 33, a communication device 34, and a map DB 35, as shown in FIG. 7. DB in FIG. 7 indicates a database. The server processor 31 is hardware for arithmetic processing coupled with the RAM 32. The server processor 31 is configured to include at least one arithmetic core such as a CPU. The server processor 31 accesses the RAM 32 to perform various processes such as updating map data. The storage 33 includes a non-volatile, storage medium, such as a flash memory. The storage 33 stores a map distribution program executed by the server processor 31. Execution of the map distribution program by the server processor 31 corresponds to execution of a map distribution method, which is a method corresponding to the map distribution program. The communication device 34 is a device for communicating with each of a plurality of vehicles in which the vehicle control system 1 is mounted via a wide area network. A vehicle hereinafter mainly refers to a vehicle in which the vehicle control system 1 is mounted.

Figure 8:
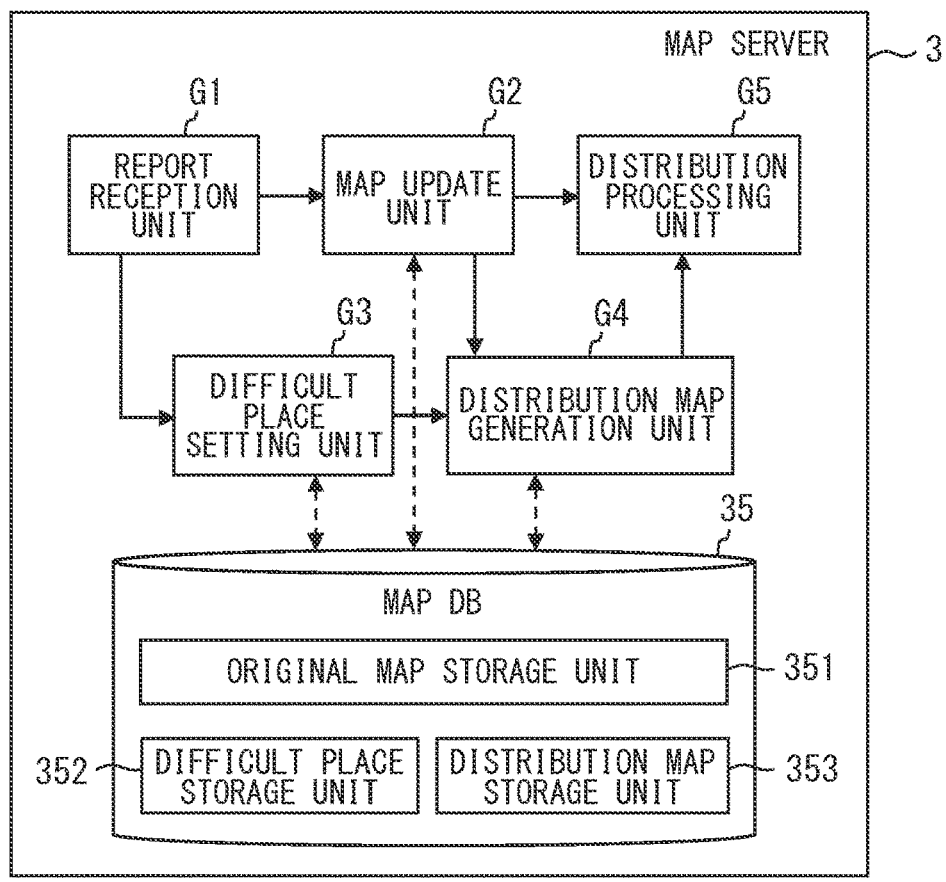
FIG. 8 is a block diagram for explaining functions of the map server.

The map DB 35 is a database that stores the map data mentioned at the beginning. The map DB 35 is implemented by using a rewritable, non-volatile storage medium. The map DB 35 is configured so that the server processor 31 can write, read, and delete data thereto/therefrom. As shown in FIG. 8, the map DB 35 includes an original map storage unit 351, a difficult place storage unit 352, and a distribution map storage unit 353. The original map storage unit 351, the difficult place storage unit 352, and the distribution map storage unit 353 may be logically partitioned using techniques such as partitioning, or may be physically independent. The original map storage unit 351 is a storage area in which original map data, which is map data for all layers and all map tiles, is stored. The original map data corresponds to a base (in other words, the original book) of distribution map data to be described later.

The difficult place storage unit 352 stores data indicating positions of difficult places in terms of vehicle control, etc., in a classified manner for each point. The data for each of the difficult places indicates the position coordinates for the difficult place, the type of application that is difficult to continue (in other words, automatic control function), the affected range, and the like. Data for a given difficult place may be periodically updated based on cancel point reports from vehicles for that point. The data for each difficult place should be held in any data structure such as list format.

The distribution map storage unit 353 is a storage area for storing map data for distribution (i.e., distribution map data, hereinafter). The distribution map data corresponds to map data acquired by extracting only the map elements to be distributed to vehicles from among the map elements registered in the original map data, as will be described later. Alternatively, the distribution map data can be a data set acquired by adding information such as a predetermined travel track model and the like to the map elements included in the original map data. The distribution map data is also managed and distributed in units of map tiles having a predetermined size.

The map server 3 provides functions corresponding to various functional blocks shown in FIG. 8 by the server processor 31 performing the map distribution program stored in the storage 33. That is, the map server 3 has, as functional blocks, a report reception unit G1, a map update unit G2, a difficult place setting unit G3, a distribution map generation unit G4, and a distribution processing unit G5.

The report reception unit G1 acquires, or receives, the probe data and the cancel point report uploaded from the vehicle control system 1 via the communication device 34. The report reception unit G1 provides the probe data acquired from the communication device 34 to the map update unit G2. In addition, the report reception unit G1 provides the cancel point report acquired from the communication device 34 to the difficult place setting unit G3.

The map update unit G2 performs process for updating original map data based on the probe data transmitted from a plurality of vehicles. For example, by integrating observation coordinates reported from a plurality of vehicles for the same feature, the position of the feature is determined and the map data is updated. More specifically, the map update unit G2 calculates a variance of the position coordinates observed by a plurality of vehicles for the same feature, and if the variance is less than a predetermined threshold, a median value/average value is adopted as the integrated observation position, which is represented as statistical observation position coordinates of the feature.

The map update unit G2 calculates, for each of the observed features, the amount of deviation between the integrated observation position statistically determined by the above method and the position coordinates in the original map data. Then, if the deviation amount of the position coordinates exceeds a predetermined error range, the position coordinates of the feature in the original map data are updated to the integrated observation position. For a feature whose observed position variance is equal to or greater than a predetermined threshold, for example, a verification flag may be set to suspend an update. Here, as an example, when the deviation amount of the position coordinates is within a predetermined error range (for example, less than 10 cm), it is regarded as an observation error and is not detected as a change point of the map. According to such a configuration, it is possible to reduce the possibility that the map data is frequently updated due to the observation error. The amount of allowable error can be changed as appropriate. Features that are not registered in the map data may be registered in the original map data as newly provided features. In addition, a feature registered in the original map data and not observed by a plurality of vehicles may be regarded as having been removed in the real world and may be deleted from the original map data. It should be noted that assessment of variance in the integration process is not essential and may be omitted.

The map update unit G2 updates the original map data, for example, at a predetermined cycle. The update cycle may be every day, every week, or every month. Also, the feature may be updated in order from the feature for which a predetermined number of probe data are accumulated. The number of update requiring reports, which is the number of probe data requiring an update of the position coordinates of one feature, can be set to 10, for example. The number of update requiring reports may be 8, 12, or the like. It can be expected that accuracy will increase as the number of update requiring reports increases. Real-time performance can be enhanced by reducing the number of update requiring reports. The map update unit G2 notifies the distribution map generation unit G4 of information on the updated map tiles.

The difficult place setting unit G3 sets a point that satisfies a predetermined difficult place setting condition as a difficult place. The difficult place setting conditions are conditions for extracting points corresponding to the difficult places described above. Various items such as a record of suspension of the automatic control function, in-vehicle equipment, road structure, traffic volume, weather, time of day, and the like can be adopted as constituent elements of the difficult place setting condition. The expression "point" here includes the concept of a section of a road having a given length. That is, the expression "point" can be replaced with "section".

For example, the difficult place setting unit G3 sets difficult places based on the cancel point reports transmitted from each of the vehicles. As a more specific example, the difficult place setting unit G3 sets, as a difficult place, a place where the number of receptions of the cancel point report within a predetermined collection time of such reports is equal to or greater than a predetermined number of difficult place recognitions. The collection time can be 1 hour, 4 hours, 1 day, and so on. The difficult place recognition count is a threshold for distinguishing between (a) a point where it is difficult to perform or continue the automatic control function only with the surrounding monitoring sensor 11 (that is, a difficult point in terms of control) and (b) a point where it is not. The number of times of difficult place recognition can be set to 3 times or 5 times, for example. The difficult place recognition count may be set to a greater value as the collection time is longer. In addition, the difficult place setting unit G3 sets, as a difficult place candidate, a place where the number of receptions of the cancel point report within a certain period of time is equal to or greater than a predetermined candidate threshold, and, based on the road structure of the difficult place candidate and reception frequency of the cancel point reports thereafter, the difficult place candidate may formally be registered as a difficult place. A candidate threshold may be set, for example, two times. In the above example, that the number of receptions of the cancel point report is equal to or greater than the predetermined number of difficult place recognition corresponds to the difficult place setting condition.

Further, the difficult place setting unit G3 may set, as a difficult place, a place where the probability of the automatic control function being cancelled is equal to or higher than a predetermined difficult place recognition probability value, based on reports from a plurality of vehicles. The difficult place recognition probability can be, for example, 10%, 20%, or 30%. The control cancellation probability, which is a probability that the automatic control function is cancelled at a certain point, shall be a ratio of the number of times the cancel point report is received to the number of vehicles having passed through such point with the automatic control function being enabled. The traffic volume of vehicles in which the automatic control function is being enabled as a population may be identified by communication with each of the vehicles. For example, the map server 3 may instruct vehicles passing through a point set as a difficult place candidate to report the execution status of the automatic control function, for counting the number of vehicles passing through the point and for collecting a continuation state of the automatic control function from each vehicle. In the above example, the difficult place setting condition is that the probability of interrupting the automatic control function is equal to or greater than a predetermined threshold.

In addition, a difficult place may be set separately for each of the preventive safety packages. Vehicles with older versions of the preventive safety package may find it as a difficult place, while vehicles with the latest version of the preventive safety package may not. According to the configuration in which difficult places are set separately for each of the preventive safety packages, it is possible to reduce the risk of setting excessive number of difficult places for a vehicle model equipped with a new version of the preventive safety package. Based on the same technical concept, difficult places may be set separately for each vehicle model or for each automatic control function.

As described above, according to the configuration for setting a difficult place based on cancel point reports from a plurality of vehicles, it is possible to reduce the risk of erroneously setting a difficult place even though it is actually a point where the automatic control function can be continued. In addition, it is possible that a point where control can be continued in terms of road structure is actually a difficult point due to an unexpected reason. According to the configuration for setting a difficult place based on cancel point reports from a plurality of vehicles, the map server 3 can appropriately set difficult places not only due to the road structure but also in line with reality.

Further, the difficult place setting part G3 may set a difficult place based on the road structure, past accident history, and the like. For example, the difficult place setting unit G3 may set a multi-forked road (also referred to as a multi-way intersection), which is an intersection where five or more roads converge, as a difficult place regardless of the reception status of the cancel point report. The multi-forked roads include 5-forked roads, 6-forked roads, 7-forked roads, and the like. Also, an intersection where arterial roads, which are roads having a number of lanes or road width equal to or greater than a predetermined value, intersect may be set as a difficult place. The reason of the above is that, in such an intersection, the intersection itself is large, and it is difficult to recognize the position of the lane markings on an exit side therefrom, and it is difficult to calculate the travel track in the intersection to the road on the exit side only with the autonomous sensor. In addition, when turning right or left at large intersections, it is difficult to recognize the traffic conditions on the exiting road. A large-scale intersection may correspond to a difficult place, which is specifically a point having geographical conditions that make it difficult to perform vehicle control. As another embodiment, all intersections may be designated as difficult places regardless of the size of the intersection.

Also, a lane that was allowed to go straight up to the previous intersection may become a left-turn-only lane or a right-turn-only lane at the next intersection. On such roads, it may be difficult to change lanes after a vehicle-mounted camera or the like recognizes a signboard or road marking indicating that the lane is for right or left-turn-only. Based on such circumstances, a point where a lane that was allowed to go straight at the previous intersection becomes a left-turn-only lane or a right-turn-only lane at the next intersection may also be set as a difficult place. As described above, intersections connected by left-turn lanes or right-turn-only lanes may correspond to difficult places, specifically, which are points having geographical conditions that make it difficult to perform vehicle control.

For example, a no-lane point, such as a toll gate on an expressway, can also be a difficult place because it is difficult to identify the travel position of the vehicle and to calculate the planned travel track. Also, at branch points and merging points on expressways, there may be cases where it is difficult to determine the planned travel track for merging or exiting only from the observation results of the surrounding monitoring sensor 11. Therefore, branch points and merging points on expressways can also be set as difficult places. Junctions and interchanges can also be included in branch points and merging points on expressways.

Furthermore, it becomes difficult to recognize distant objects in places where the amount of change in longitudinal gradient changes abruptly or on sharp curves. In addition, since the gradient itself is difficult to detect with a camera, it is easy to misestimate the position of the detected object. In addition, at tunnel entrances and exits, camera gain and aperture may not be adjusted in time, resulting in blown-out shadows or blown-out highlights, resulting in reduced image recognition accuracy. Therefore, steep gradient change points where the degree of change in the longitudinal gradient of the road is equal to or greater than a predetermined threshold, sharp curve entrances and tunnel exits where the curvature is equal to or greater than a predetermined value can also be set as difficult places.

Railroad crossings may also be difficult to recognize depending on the scene, for example, when the light is backlit, when it is raining, at night or the like. In addition, when passing through railroad crossings, it is necessary to be careful of approaching trains. Therefore, railroad crossings can also be difficult places to watch out for.

Furthermore, there are cases in which road repair marks are erroneously recognized as lane markings or road edges in the image recognition process. Misrecognition of lane markings or road edges can lead to erroneous estimation of the lateral position of the vehicle on the road. Therefore, a misrecognition factor addition point, which is a point where there is a feature that may be misrecognized as a lane marking or road edge, such as a road repair mark, may also be set as a difficult place. A spot where the lane marking is unclear, which is a spot where the lane marking is unclear, can also be set as a difficult place. This is because the recognition rate of the lane markings is lowered at points where the lane markings are unclear, making it difficult to identify the traveling position of the vehicle and to calculate the planned travel track.

As mentioned above, points with road structures that can become difficult places include, for example, large-scale intersections, points where left/right turn lanes appear, points with no lanes, junctions and merging points on expressways, points where there is a sudden change in gradient, steep curves, railroad crossings, points where misidentification elements are added, and points where lane markings are unclear.

Of course, the difficult place setting unit G3 may be configured to combine the number of receptions of cancel point reports from the vehicles and the road structure data to determine whether it is a difficult place. This is because there may be cases where the automatic control function can actually be continued even in places that are considered to be difficult places in terms of road structure. In other words, it is preferable to set a difficult place in consideration of the reception status of the cancel point report. According to such a configuration, it is possible to reduce the risk of setting too many difficult places. For example, the difficult place setting unit G3 sets a point having a predetermined geographical condition as a difficult place candidate, and based on the fact that the number/frequency of reception of cancel point reports from vehicles at the difficult place candidate is equal to or greater than a predetermined value, a difficult place candidate may then be set as a difficult place.

In addition, snow-covered points, sand-covered points, etc. can also be dynamically set at a difficult place. This is because the recognition rate of lane markings decreases at snow-covered points, sand-covered points, etc., making it difficult to identify the traveling position of the subject vehicle and to calculate the planned travel track. In addition, a point where it is difficult to recognize the lane marking due to a puddle may also correspond to a difficult place. It should be noted that snow-covered locations, sand-covered locations, and the like may correspond to points where it is difficult to continue vehicle control while maintaining a certain level of performance due to dynamic conditions such as weather. Also, a point where there is a temporary obstacle such as a fallen object or a vehicle parked on the road may be set as a difficult place. This is because the control plan for avoiding obstacles requires attention to the positional relationship with surrounding moving objects, and the difficulty level of such a control plan is higher than a control plan of simply traveling along a road.

In addition, there may be a spot that is treated as a difficult place only during a specific time period. For example, at night or in rainy weather, it is difficult to recognize a traffic signal. Therefore, even an intersection that is not set as a difficult place in the daytime may be set as a difficult place at night or in rainy weather. The setting of the difficult place may be changed dynamically according to the season and weather. A difficult place may be set based on the frequency of occurrence of traffic accidents in the past. In such case, for example, a point where the number of traffic accidents that have occurred in the most recent predetermined period (for example, during one year) is equal to or greater than a predetermined threshold value can be set as a difficult place.

Note that the points and scenes illustrated above are merely examples, and it is not necessary to set all the points illustrated above as difficult places. The data such as the position information of the difficult place set by the difficult place setting unit G3 is registered in the difficult place storage unit 352. In the difficult place storage unit 352, each difficult place is managed by assigning a difficult place ID, which is a unique identification number.

The distribution map generation unit G4 is configured to generate distribution map data based on the difficult place information stored in the difficult place storage unit 352 and the original map data stored in the original map storage unit 351. As a preparatory process for generating distribution map data, the distribution map generation unit G4 sets a range within a predetermined related distance Rd from the difficult place as a difficult place area Ad. The related distance Rd is a parameter that defines an extent to which map elements useful for passing through a difficult place without the automatic control function being cancelled are extracted from the original map data. The related distance Rd is also, according to another aspect, a parameter that defines the range affected by the difficult place. Further, the related distance Rd can also be interpreted as a parameter that defines a preparation section for performing vehicle control in preparation for a difficult place based on the map data. In addition, the related distance Rd corresponds to a parameter that distinguishes (a) an area in which the distribution map is prepared as dense map data and (b) an area in which the distribution map is prepared as sparse map data. Such a related distance Rd may be, for example, 100 meters. Note that the related distance Rd may be 50 meters, 150 meters, 200 meters, or the like. Also, the related distance Rd may have a different value depending on the type of difficult place (in other words, factor) or the type of automatic control function that is likely to be interrupted.

Then, the distribution map generation unit G4 extracts map elements for reducing the risk of interruption of the automatic control function at a difficult place from the original map data corresponding to the difficult place area, and generates distribution map data as such an extracted data set. The details of the distribution map data will be described separately later. Note that the distribution map generation unit G4 may set the entire map tile including a difficult place as the difficult place area Ad in a framework of the map tiles in the original map data without using the related distance Rd. Also, if the difficult place is within a certain distance from the boundary of the map tile, the map tiles that are adjacent across the boundary may be included in the difficult place area.

The distribution processing unit G5 is configured to distribute distribution map data based on a request from the vehicle. For example, the map acquisition unit F2 of the vehicle requests the map server 3 for map data regarding the current position and the area to be traveled within a predetermined time. The distribution processing unit G5 distributes the map data based on such request.

Note that the distribution processing unit G5 may be configured to voluntarily distribute the map data. In addition, the distribution processing unit G5 of the map server 3 may be configured not to distribute the map to a specific vehicle Ma according to the user setting or the usage status of the map distribution service, in order to support a subscription-based map service. For the same reason, the map acquisition unit F2 of the vehicle Ma may also be variably configured, depending on the user's settings or the usage status of the map distribution service, to change whether to acquire the map data or not. The service usage status here includes the presence or absence of service usage registration, service usage fee payment status, contract plan, and the like.

<Server-Side Process>

Figure 9:
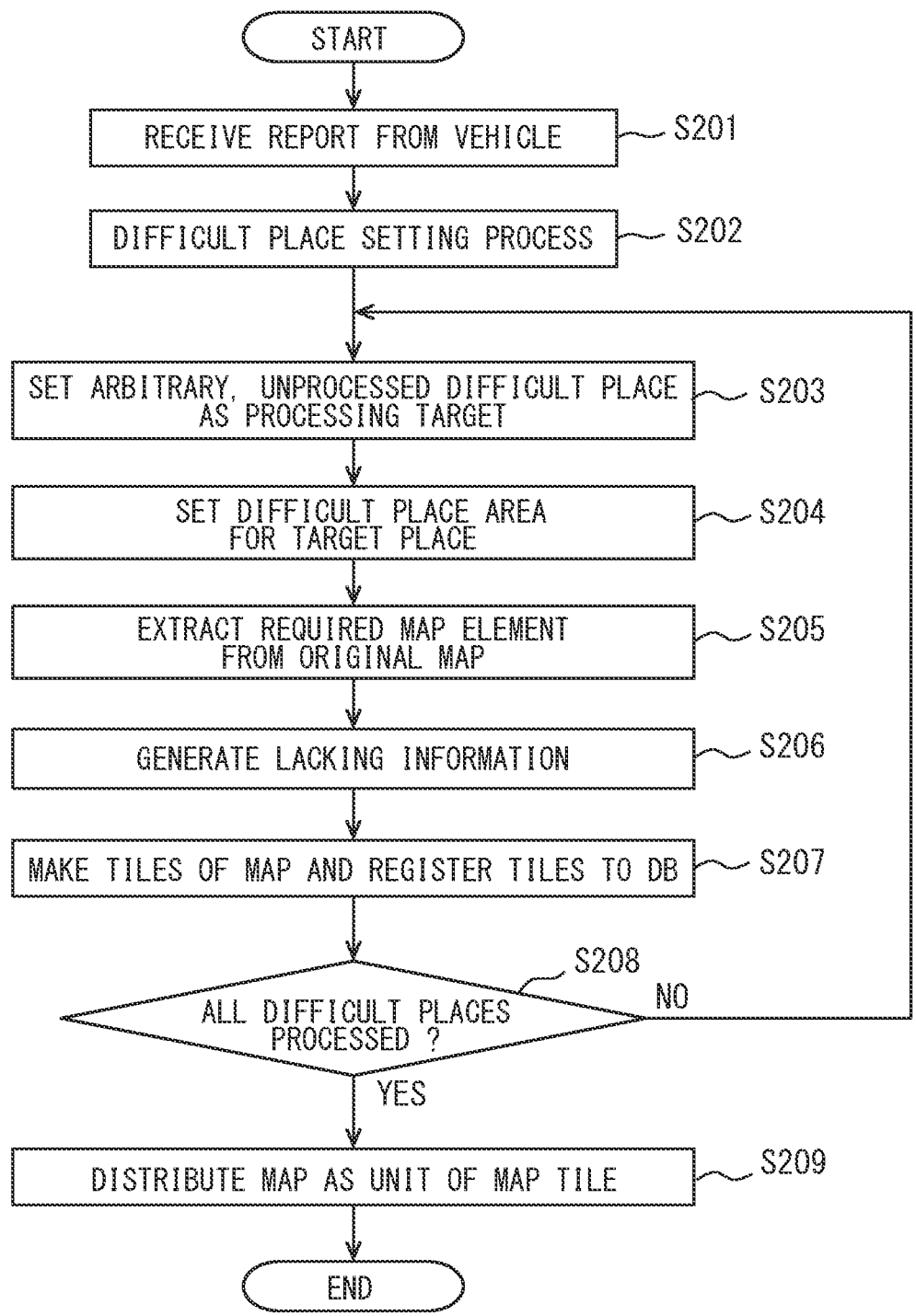
FIG. 9 is a flowchart of a distribution map generation process performed by the map server.

The distribution map generation process performed by the map server 3 will be described with reference to a flowchart shown in FIG. 9. The flowchart shown in FIG. 9 may be performed at a predetermined update cycle, for example. It may be preferable to set the update cycle to a relatively short time such as 5 minutes or 10 minutes. The distribution map generation process includes steps S201 to S209 as an example. Note that the number of steps and process procedure included in the distribution map generation process can be changed as appropriate. The update cycle may be the same as the collection time described above, or may be shorter. For example, the update cycle may be, for example, 10 minutes or 30 minutes.

Step S201 is a step of collecting cancel point reports from a plurality of vehicles by receiving cancel point reports transmitted from the vehicles. Step S201 is performed by the report reception unit G1. The process of receiving cancel point reports transmitted from each vehicle is carried out as required. When the server processor 31 receives the cancel point report, it identifies a point to be reported in the received cancel point report, and classifies and stores the received cancel point report for each point. It should be noted that the position information reported in the cancel point report may contain errors due to the positioning accuracy of individual vehicles. Considering such circumstances, the cancel point report may be saved for each section having a predetermined length.

In step S202, the difficult place setting unit G3 sets a difficult place based on the collected cancel point reports. Step S202 corresponds to a difficult place setting step. For example, as described above, the difficult place setting unit G3 sets, as a difficult place, a place where the number of receptions of cancel point report within a certain period of time is equal to or greater than the number of difficult place recognitions. Also, a point where the control cancellation probability is equal to or greater than the difficult place recognition probability value may be set as the difficult point.

The number of difficult place recognitions and the difficult place recognition probability value may be set to different values depending on the road structure. For example, at a multi-junction road such as a five-way intersection, it is foreseen that it will be difficult to continue control due to the road structure, thereby the number of difficult place recognitions may be set to a relatively small number, for a quick recognition. Conversely, straight road sections are less likely to be difficult places due to the road structure, so the number of difficult place recognitions may be set to a relatively large value. In other words, the higher the difficulty level in continuing control estimated from the road structure, the more relaxed the conditions for setting the difficult place in response to the report from the vehicle. According to such a configuration, it is possible to quickly register a place that is highly likely a true difficult place as a difficult place. In addition, the setting conditions are stricter where the possibility of being a difficult place is low. Therefore, it is possible to reduce the possibility that a place that is not actually a difficult place may be set as a difficult place due to temporary factors such as the user's mood or fallen objects. The specific example described above can be used for the method of setting a difficult place.

Figure 13:
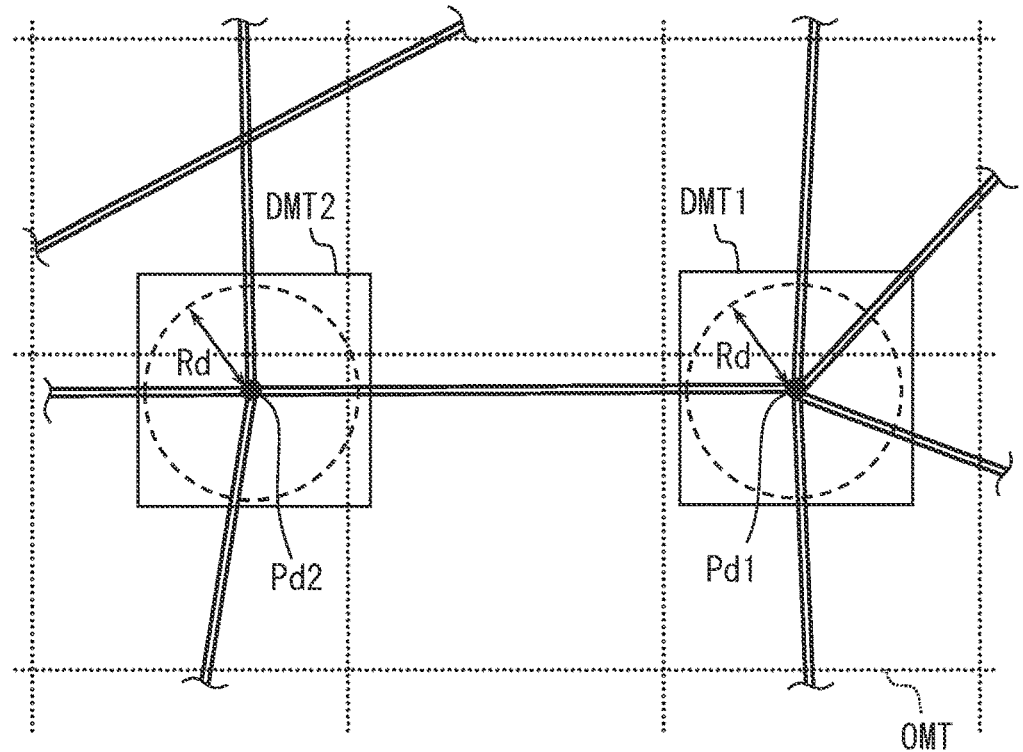
FIG. 13 is a diagram showing an example of difficult place area data generated by the map server.
Figure 19:
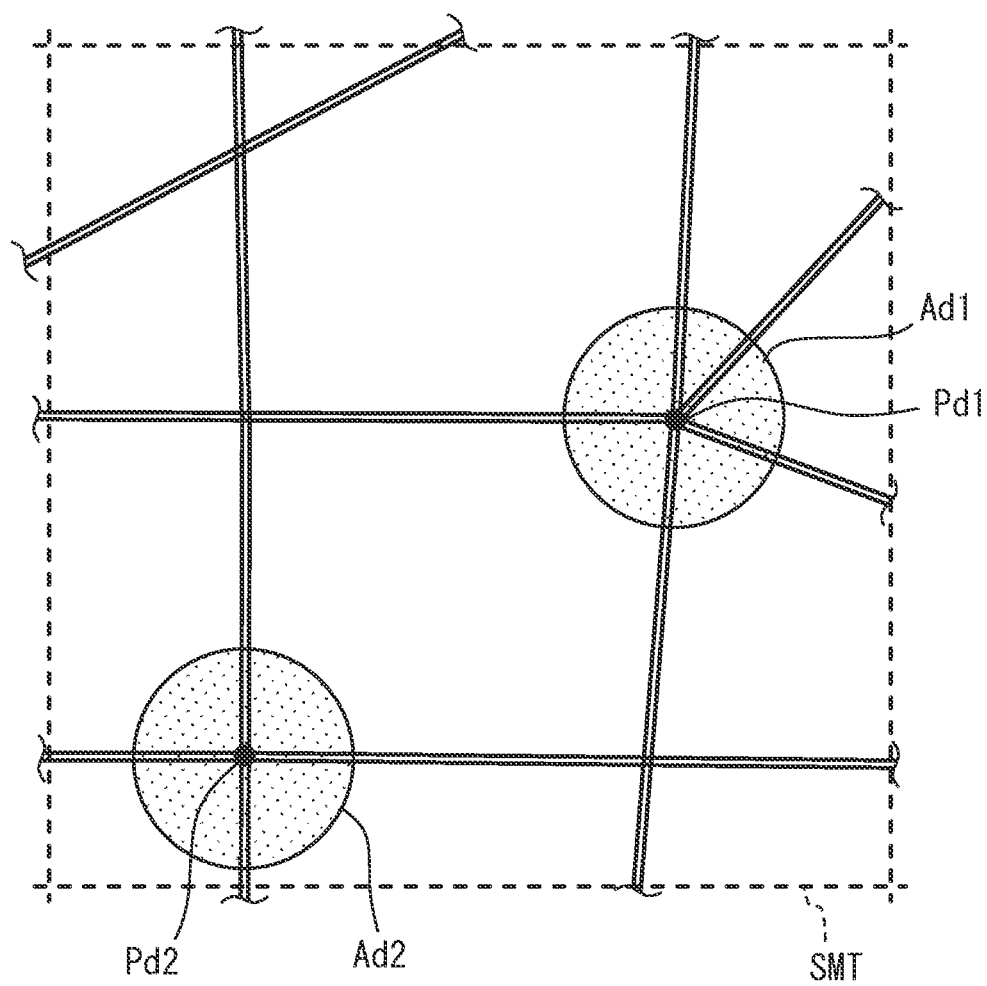
FIG. 19 is a diagram showing an example of configuration of distribution map data.

In step S203, the distribution map generation unit G4 sets any one of newly set difficult places in step S202 as a processing target place, and the process proceeds to step S204. In step S204, the distribution map generation unit G4 sets a difficult place area Ad for the target place. For example, as shown in FIGS. 13 and 19, when a certain difficult place Pd1 is a target place, a circular area within the related distance Rd from the difficult place Pd1 is set as the difficult place area Ad1, and the process proceeds to step S205.

In step S205, from the original map data corresponding to the difficult place area Ad, map elements are extracted to reduce the possibility that the automatic control function will be interrupted at the difficult place, and the process proceeds to step S206. The map elements extracted in this step are the elements included in the distribution map data related to the difficult place. Step S205 corresponds to a distribution map generation step.

The type of map element to be extracted in step S205 is hereinafter also referred to as a difficult place map element or a selected map element. The difficult place map element may be fixed regardless of the reason for cancelling the control at the difficult place or regardless of the type of the difficult place. For example, the difficult place map elements can be road marking data including division lines, road edge data, and three-dimensional object data usable as landmarks. In addition, the difficult place map elements can include longitudinal gradients, curvatures, and the like of the roads. Additionally, difficult place map elements can include road and lane network data, dynamic POIs, and static POIs. In other words, it can be anything that is necessary or useful in terms of vehicle control.

The difficult place map elements as the distribution map for difficult places may be all map elements corresponding to the difficult place area Ad in the original map data. Three-dimensional object data is extracted so that another landmark exists within at least 30 meters from a certain landmark. By including three-dimensional object data in the distribution map data so that a plurality of landmarks exist within 30 meters, a localization success rate can be increased. As a result, it is possible to reduce the risk of interrupting complex control such as traffic signal passage support and automatic driving at intersections. The upper limit of the interval between landmarks included in the distribution map may also be 25 meters or 20 meters instead of 30 meters.

Further, the difficult place map elements may be selected according to the reason why the control is cancelled at the difficult places or the type of the difficult places. For example, if the difficult place is an intersection, the road marking data in the difficult place area Ad and the data of a plurality of three-dimensional objects that can be used as landmarks are extracted. By including road marking data and landmark data, the localization process can be performed near intersections, and the accuracy of estimating the position of the vehicle can be improved. As a result, it is possible to reduce the possibility that the vehicle will become unable to estimate the position of itself and to reach the system limitation of cancelling the function. In addition, by including road markings such as stop lines and traffic lanes, it becomes easier to identify the stop position at the vicinity of the intersection. Note that the vicinity of the intersection here includes the inside of the intersection.

Further, when the difficult place is a no-lane point, such as a place in front of a toll gate or the like, the position of the road edge, the road marking data, and the landmark data in the difficult place area are similarly extracted. The position of a road edge, road marking data, and landmark data in a difficult area related area are also extracted when the reason for cancelling the control in a difficult area is snow coverage, sand coverage, or fading of lane markings.

If the reason for cancelling the control at a difficult place is a sudden change in the vertical gradient, the map information on the road gradient is extracted. If the reason for recognition as a difficult place is the presence of map elements that are likely to be mistakenly recognized as lane markings, such as repair marks, the position information of the repair marks, the information of the lane markings, and the data of a plurality of landmarks are extracted. By including the position information of the repair marks and the lane markings, it is possible to reduce the possibility of erroneously recognizing the repair marks as the lane markings. In addition, when the difficult place is a sharp curve, the position information of the curve starting point, the recommended speed at the curve starting point, the curvature of the curve, etc. correspond to useful information for control.

In step S206, information that is not included in the original map data and is necessary or useful for control is generated. For example, when the difficult place is an intersection and the original map data does not include the travelable range data within the intersection, the travelable range data within the intersection is generated based on the travel tracks of a plurality of vehicles. The travelable range corresponds to a range through which the center of the vehicle should pass at a point where there is no lane or at a point where it is necessary to cross the lane. The same can be done when the difficult place to be processed is a no-lane point that can exist from a toll gate to a ramp way on an expressway. The same can be said when the difficult place is a point where the main line and the acceleration lane of the expressway merge, or a point where the main line changes to a side road.

Figure 10:
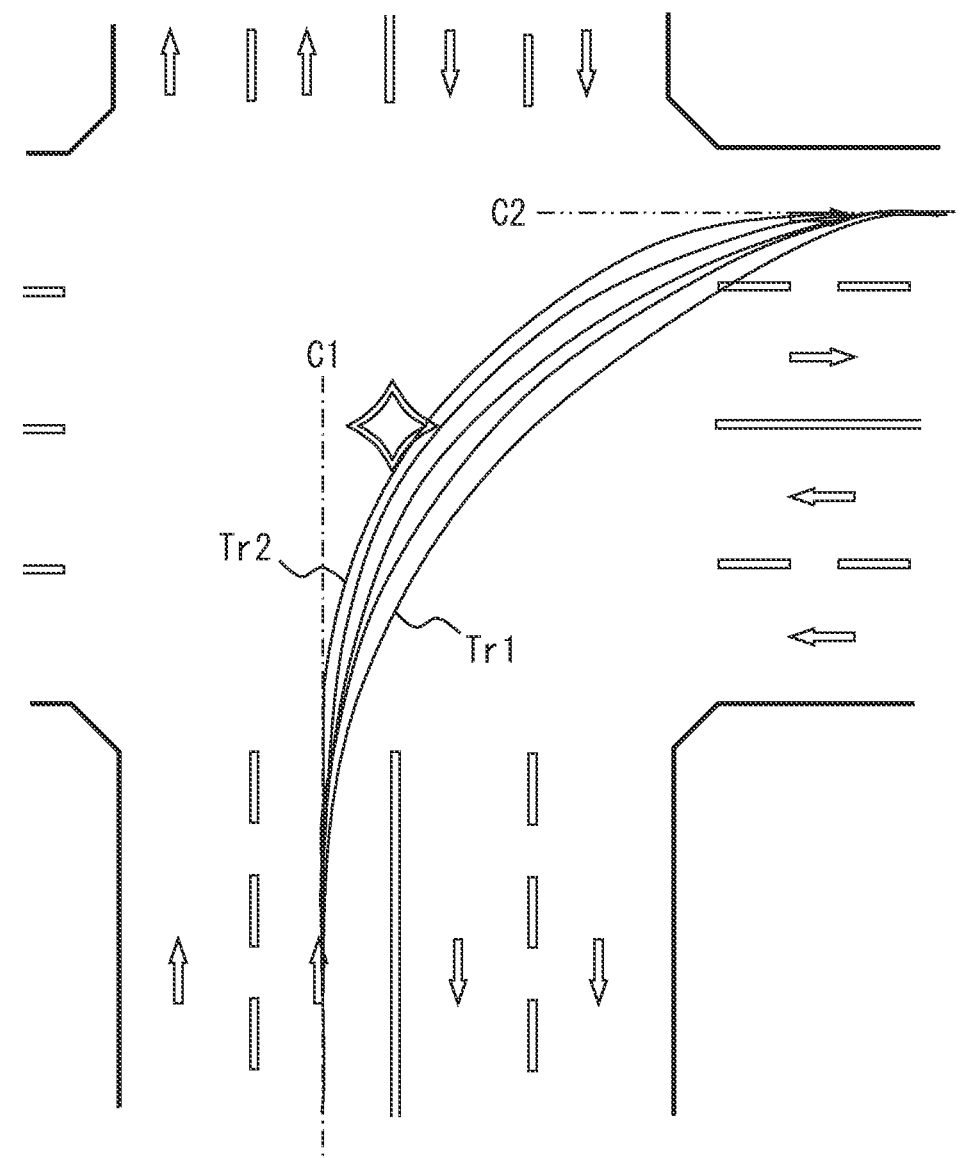
FIG. 10 is a diagram for explaining a method of generating travelable range data.

For example, the method disclosed in a prior art can be adopted as a method for calculating the travelable range. Specifically, as shown in FIG. 10, among the travel tracks that enter a transition destination lane from a transition source lane, the travel track data that starts to leave the transition source lane at the earliest timing is set as a first travel track Tr1. Further, travel locus data that starts to leave the transition source lane at the latest timing among the travel loci entering from the transition source lane to the transition destination lane is set as a second travel locus Tr2. Then, the range sandwiched between the first travel locus data and the second travel locus data is set as the travelable range. The travelable range is data indicating the travelable range when the vehicle is driven by using the driving function or the driving support function.

Note that the transition source lane when turning right or left at an intersection refers to a lane located on an approach side when viewed from the intersection. The transition destination lane when turning right or left at an intersection refers to a lane located on an exit side when viewed from the intersection, in other words, a lane where the vehicle enters after turning left or right. The point at which the travel locus begins to depart from a certain lane can be, for example, a point at which the angle formed by the travel locus with respect to the center line of the lane is equal to or greater than a predetermined threshold value (for example, 2 degrees). A one-dot chain line indicated by a symbol C1 in FIG. 10 represents the center line of the exit lane, and a two-dot chain line indicated by a symbol C2 represents the center line of the transition destination lane.

Figure 11:
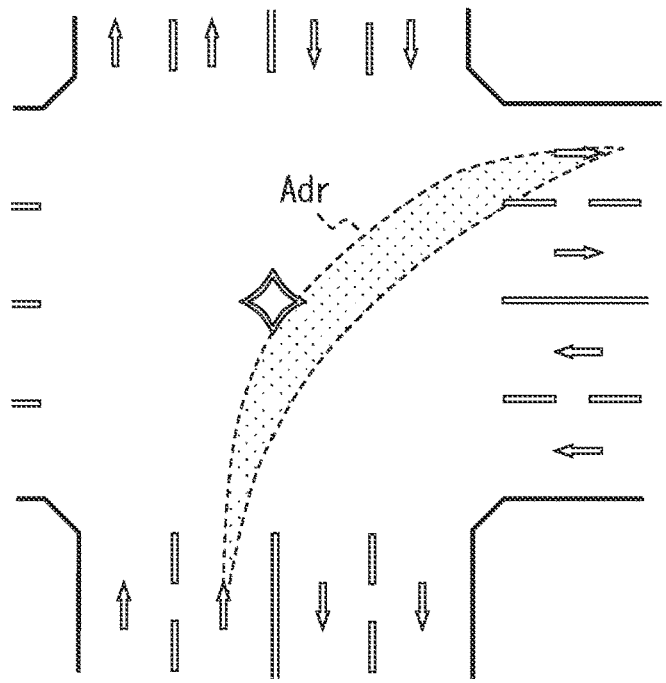
FIG. 11 is a diagram conceptually showing a travelable range when turning right.

FIG. 11 conceptually shows a travelable range Adr generated by the above method. The hatched portion in FIG. 11 corresponds to the travelable range. The travelable range can be set for each combination of the transition source lane and the transition destination lane. Though FIGS. 10 to 12 exemplify the travelable range for the pattern of entering the first lane (i.e., a left-most lane) after turning right, the map server 3 may generate a travelable range for entering the second lane.

Figure 12:
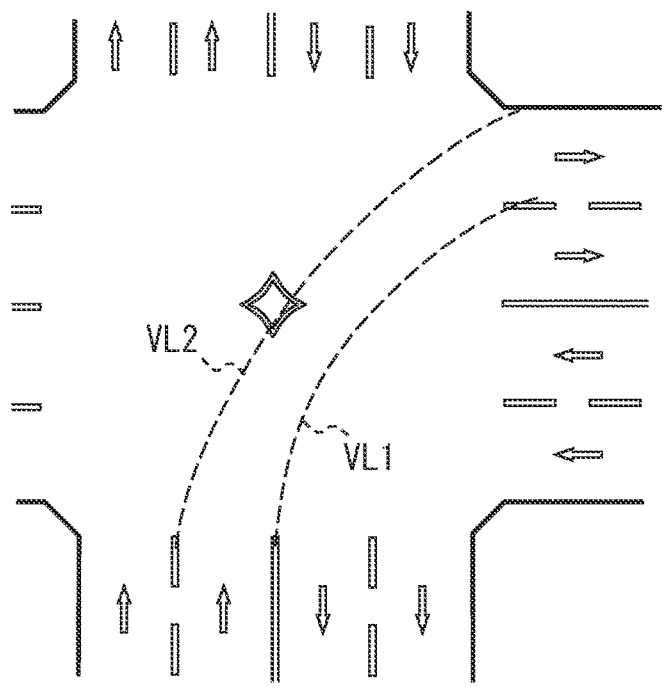
FIG. 12 is a diagram showing a virtual lane for determining a travel track when turning right.

Note that the travelable range data may be a data set indicating virtual lane markings as shown in FIG. 12. A line VL1 shown in FIG. 12 represents a virtual right lane marking that connects the right lane marking of the transition source lane and the right lane marking of the transition destination lane, and a line VL2 represents a virtual left lane marking that connects the left lane marking of the transition source lane and the left lane marking of the transition destination lane. Each virtual lane line can be generated by linearly interpolating each lane line with reference to road markings such as a diamond mark at the center of an intersection and a non-illustrated lane guide.

Furthermore, the map server 3 may employ a travel track model indicating a single travel locus to be followed by the vehicle instead of the data indicating the travelable range as the map information for turning right or left at the intersection. For example, the method disclosed in a prior art can be used as a method for generating a travel track model in an intersection. For example, a temporary travel track in the intersection is generated based on road markings such as a lane guide in the intersection, and the temporary travel track is aligned with the lane center lines C1 and C2 on the entrance and exit sides of the intersection, respectively, by correcting the shape and position of the travel track model to connect lines smoothly.

Road markings that can be used to generate a virtual lane and a travel track model in an intersection include, for example, the edge of a track, an arrow mark, and a diamond-shaped mark placed at the center of an intersection. Also, a road surface area having a particular color such as red, blue, or green, which indicates a road surface area through which a vehicle making a right or left turn, can also be used as a road marking. In the present disclosure, data for determining the travel track of a vehicle at a point where there is no lane or where it is necessary to cross lanes is referred to as track determination data. The track determination data specifically includes data indicating a travelable range, virtual lane data, and a travel track model. The track determination data corresponds to data that directly or indirectly indicates the track on which the vehicle should travel.

The track determination data for merging from the acceleration lane of the expressway to the main line, and the track determination data for moving from the expressway main line to the deceleration lane or another main line are generatable with the same method as the track determination data for passing through the intersection. The same applies to the track determination data for traveling on a no-lane point. If a plurality of expressway gates are arranged in parallel, it is possible to generate track determination data for each combination of lanes provided by toll gates and the ramp way.

If the original map data originally includes the above-described track determination data corresponding to the difficult place, there is no need to generate new track determination data in step S206. If the original map data includes the track determination data corresponding to the difficult place, the server processor 31 may extract the track determination data corresponding to the difficult place from the original map data as a difficult place map element in step S205. In other words, step S206 can be omitted when necessary and sufficient map information is prepared in step S205 as a distribution map for a difficult place.

In step S207, a data set including the map information extracted in steps S205 and S206 is registered in distribution map storage unit 353 as a new map tile. This map tile corresponds to distribution map data related to a difficult place to be processed. The map tile for distribution related to the difficult place set in step S207 is also referred to as a difficult place map tile. A difficult place map tile corresponds to an example of difficult place area data, which is distribution map data for a difficult place. The size of the difficult place map tile can be, for example, a rectangular shape that includes the difficult place area Ad. For example, it may be rectangular with a side length two to three times the related distance Rd. A difficult place map tile is set so that, for example, a difficult place is located in the center. When the registration of the difficult place map tile for the difficult place to be processed is complete, the process proceeds to step S208.

In step S208, it is determined whether or not difficult place map tiles as distribution map data have been generated for all the difficult places registered in step S202. If an unprocessed difficult place remains, the process returns to step S203, an arbitrary unprocessed difficult place is set as a processing target, and the processes after step S203 are performed. When the setting of map tiles for all difficult places registered in step S202 is complete, the process proceeds to step S209. In step S209, the distribution map data stored in the distribution map storage unit 353 is distributed, for example, based on a request from the vehicle, and the flow comes to an end. Step S209 corresponds to a distribution process step. It should be noted that the distribution of distribution map data may be performed based on requests from vehicles sequentially and independently of the process shown in FIG. 9.

FIG. 13 is a diagram conceptually showing a difficult place map tile generated by the distribution map generation process described above. As shown in FIG. 13, the difficult place setting unit G3 sets difficult places Pd1 and Pd2 based on cancel point reports from a plurality of vehicles (step S202). The difficult place Pd1 is, for example, a five-way intersection. Also, the difficult point Pd2 is a connection point between the main roads. The distribution map generation unit G4 sets the difficult place areas Ad1 and Ad2 based on the difficult places Pd1 and Pd2 (step S204). The difficult place area Ad1 can be, for example, a range within the related distance Rd from the center of the intersection set as the difficult place Pd1. The difficult place area Ad2 can be, for example, a range within the related distance Rd from the center of the intersection set as the difficult place Pd2. The difficult place areas Ad1 and Ad2 may be separated by a distance of 25 meters or more. If the distance between the difficult places Pd1 and Pd2 is, for example, less than a predetermined connecting distance, they may be combined into one difficult place. The connecting distance can be, for example, 20 meters or 30 meters. In the configuration in which a difficulty level is set for each of the difficult places, the greater the number of connections in a difficult place, the higher the difficulty level may be set to such difficult place.

Figure 14:
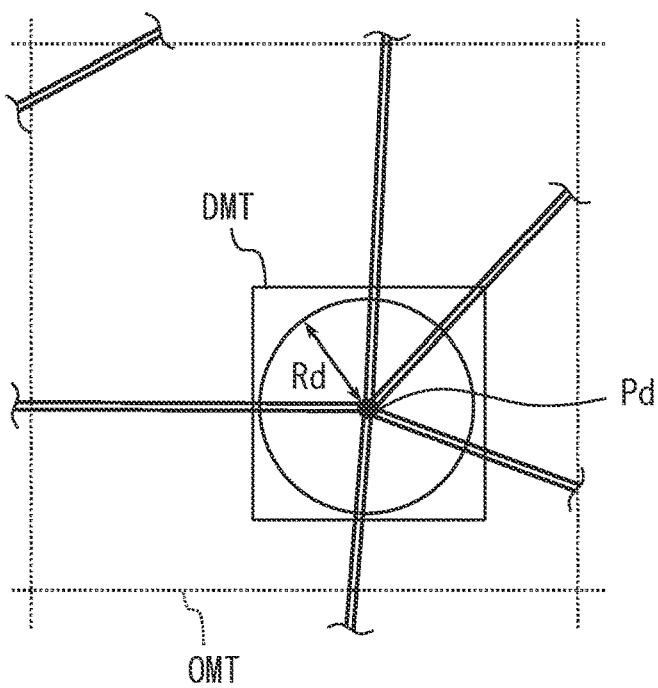
FIG. 14 is a diagram showing a modified example of a size ratio between a difficult place area and map tiles included in an original map.

Then, in each of the difficult place areas Ad1 and Ad2, map information useful for vehicle control is extracted from the original map data (step S205), and map tiles are made. DMT1 in the drawing represents a map tile corresponding to the difficult place Pd1, and DMT2 represents another map tile corresponding to the difficult place Pd2. OMT represents original tiles, which are map tiles in the original map data. Note that the size ratio of the difficult-place map tiles DMT to the original tiles OMT can be changed as appropriate. For example, as shown in FIG. 14, the difficult place map tile DMT may be significantly smaller than the original tile OMT. Paradoxically, the original tile OMT may be significantly greater than the difficult place map tile DMT.

Figure 15:
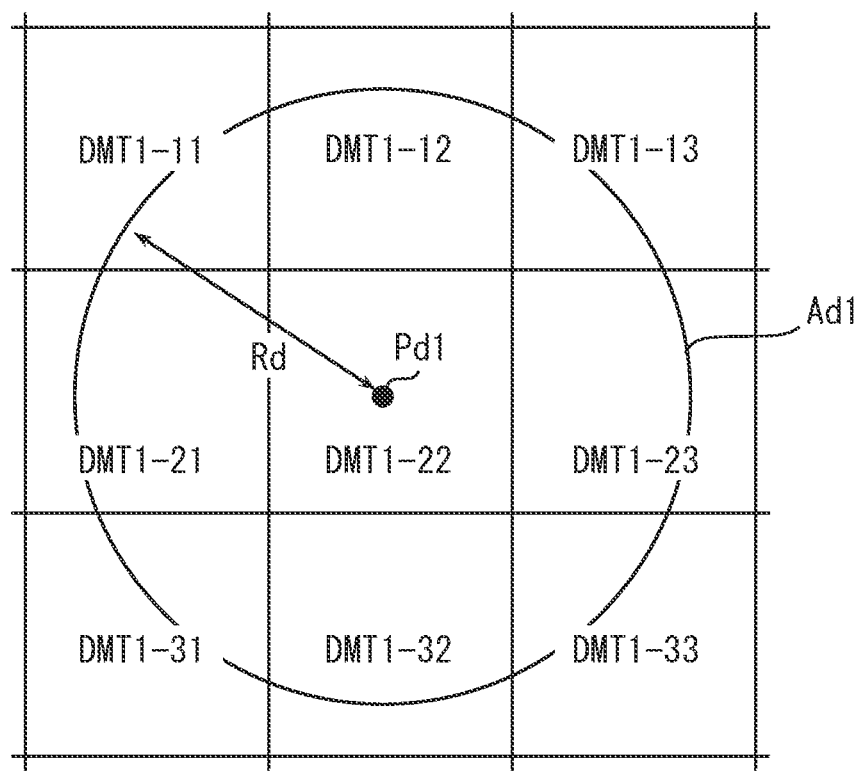
FIG. 15 is a diagram showing a setting example of map tiles constituting the difficult place area data.

The difficult place map tile DMT is not limited to a rectangular shape, and may have other shapes such as circular, hexagonal, or the like. For example, the difficult place area Ad itself may be set as one circular map tile. Also, a plurality of difficult place map tiles DMT may correspond to one difficult place area Ad as shown in FIG. 15. In other words, the distribution map data for one difficult place may be divided into a plurality of difficult place map tiles. DMT1-11 to 13, DMT1-21 to 23, and DMT1-31 to 33 in FIG. 15 indicate individual difficult place map tiles. The distribution processing unit G5 distributes the difficult place map tiles DMT generated as described above based on a request from the vehicle. If the distribution map data is generated separately for each vehicle model, the distribution map data corresponding to the model of the vehicle that has requested the map data is distributed. Similarly, when distribution maps are generated separately for each of different versions of the preventive safety package and for each of the different kinds of the in-vehicle equipment, distribution map data corresponding to the requesting equipment and the like is distributed.

According to such a configuration, the distribution processing unit G5 distributes only the map data related to the difficult places to the vehicle. In other words, the distribution processing unit G5 does not distribute the map data for the normal area other than the difficult place area Ad. Therefore, the amount of map data acquired by the vehicle is suppressed, thereby suppressing the cost related to communication and the like. In addition, since the size of the map data used by the vehicle is reduced, the amount of data flowing through the in-vehicle network Nw can also be reduced. For example, the map data size is reducible down to the extent that it can be transmitted by an existing communication method such as CAN. As a result, it is possible to reduce the risk of needing to introduce a new communication network such as Ethernet or FlexRay for map data transmission. Compared to CAN and the like, Ethernet and FlexRay are new communication methods capable of performing large-capacity communication, so their installation costs are relatively high. In other words, by reducing the amount of the map data, it becomes unnecessary to replace the in-vehicle network Nw with an expensive network.

In addition, since map data useful for vehicle control is distributed, it is possible to reduce the risk of cancellation of the automatic control function in the vehicle. In other words, it is possible to reduce the cost of using the map data while reducing the possibility that the automatic control function is cancelled. The concept that the amount of information to be distributed is small also includes the concept of not distributing information. Therefore, the above configuration corresponds to a configuration for distributing a data set, in which more map elements are included for the difficult place area than for the normal area.

The difficult place area data for an intersection set as a difficult place may preferably be configured to include a position of the stop line, the position information of the traffic signal, and the type and position information of the road markings existing inside the intersection. According to such a configuration, it is possible to accurately identify the position of the subject vehicle in the intersection based on those markings, and to stop at a place where the vehicle should be stopped. Further, it may be preferable that the difficult place area data related to an intersection include track determination data for each of the traveling directions inside the intersection. The data that directly or indirectly indicates a travel track corresponds to data for determining the travelable range, the virtual lane, the travel track model, and the like. According to such a configuration, it is possible to generate a reasonable track within an intersection. A reasonable track means a track that complies with traffic rules and, more preferably, a track that does not give a sense of discomfort to drivers of surrounding vehicles. A track that does not give discomfort to drivers of surrounding vehicles can also be understood as a track that conforms to the customs and traffic manners of the area where the system is used. A reasonable track can also be interpreted as a track that does not include sudden deceleration, sudden acceleration, or sudden steering.

Further, distribution map data related to connection points between the main line of the expressway and the acceleration or deceleration lane may preferably be associated with track determination data at the connection point and information on at least two landmarks in front of the connection point. According to such a configuration, the localization process can be performed before reaching the connection point, and the remaining distance to the connection point can be identified with high accuracy. In addition, since the distribution map data includes the track determination data, it is possible to make the travel track at the connection point more reasonable than the track generated only by the surrounding monitoring sensor 11.

Further, the difficult place area data for a no-lane point, which is a point where no lane marking is installed, preferably includes data indicating the installation positions of the lane marking and the road edge, and information on a plurality of landmarks. According to such a configuration, it is possible to determine the detailed position of the subject vehicle with respect to the road based on the landmarks and road edges. In addition, since lane marking information is included, it is possible to identify which lane the vehicle is traveling in, even when the lanes cannot be seen.

The difficult place area data for the difficult place due to dynamic factors may also include map information according to the difficult place factor. For example, the difficult place area data for snow-covered points and sand-covered points can be a data set that includes data indicating the installation positions of lane markings and road edges, and information on a plurality of landmarks, as in the case of no-lane points. In addition, since the road edge is a three-dimensional object, it is easier to detect its position than the lane markings even under conditions such as snow cover and the like. According to the above configuration, the lateral position of the vehicle can be estimated with reference to the road edge. According to the above configuration, it is possible to determine the detailed position of the subject vehicle relative to the road based on the landmarks and road edges, and to identify which lane the vehicle is traveling in, even when the lanes cannot be seen. As a result, it is possible to make the actual travel track more reasonable than the track generated only by the surrounding monitoring sensor 11.

Further, the difficult place area data of snow-covered points and sand-covered points may include track determination data determined based on the travel loci of other vehicles. As the track determination data, for example, a travel track model, virtual lane data, or the like can be employed. According to such a configuration, the drive support ECU 20 of the vehicle can generate a reasonable travel track based on the track determination data, even in a section where lane markings are difficult to see due to accumulated snow or the like.

In addition, the difficult place area data for difficult places caused by obstacles such as fallen objects may also include data of a plurality of landmarks and track determination data determined based on the travel loci of other vehicles. However, it may be preferable that the track determination data to be included in the data of the difficult place area caused by obstacles is generated based on the travel locus data collected after the obstacle appeared, for example. This is because the travel track data before the obstacle appears can become noise when planning a travel track that avoids the obstacle.

For example, when a difficult place due to the appearance of an obstacle is registered by the difficult place setting unit G3, the distribution map generation unit G4 generates a temporary track determination data around the difficult place based on a plurality of travel locus data received after the appearance (S206). Then, the distribution processing unit G5 distributes the data set including the track determination data as the difficult place area data. According to the above configuration, the drive support ECU 20 can generate in advance a smooth travel track for avoiding obstacles based on the track determination data, thereby enhancing the user's convenience. It is foreseen that the obstacle will disappear over time. In view of such circumstances, it is preferable that the track determination data in the vicinity of the point where the obstacle exists is updated, for example, every 10 to 30 minutes. Of course, if it is detected that the obstacle itself has disappeared, the difficult place setting itself is released, so the distribution of the track determination data as the difficult place area data can also be stopped.

By the way, each vehicle cannot identify whether the subject vehicle is traveling/existing in a normal area or a difficult place area unless it sends an inquiry to the map server 3. Therefore, the vehicle might send a request for map data to the map server 3 even when it exists in the normal area, in the same way as when it exists in the difficult place area. If the map server 3 does not send anything regarding the normal area in response, the vehicle cannot determine whether the communication for the map request has failed or the map itself does not exist. In view of such circumstances, when the map server 3 receives a request for map data of a point corresponding to a normal area from a vehicle, it returns response data including a predetermined bit string such as Null or the like. According to such a configuration, when the vehicle obtains a response signal from the map server 3 in response to a request for a map of the normal area, it tells the situation either as (a) the map not obtainable due to communication trouble or the like or (b) no map data prepared for the normal area. Note that map tile data that does not actually include map elements can also be understood as a type of map data for the normal areas.

In addition, the map server 3 may be configured to generate and distribute normal area data, which is distribution map data including information about predetermined map elements, for normal areas other than the difficult place areas. The normal area can be, for example, a portion of the range defined by the original tiles excluding the difficult place areas. In addition, the normal area data may be divided and distributed in units of map tiles, for example, and the size of the map tile of the normal area in such case may be the same as that of the map tiles of the difficult places, in terms of the recording target range in the real world. The map tiles of the normal area and the map tiles of the difficult place may be set to overlap, i.e., may have an overlapping recording target range in the real world. The normal area data may be divided so that the data size is equal to or less than a predetermined value. The map server 3 may distribute at least one of the normal area data and the difficult place area data based on a request from the vehicle.

The distribution map generation unit G4 may preferably be configured to thin out the map information to be recorded so that the data size per unit area of the map or per unit road length for the normal area is less than half of the map for the difficult place area. For example, the normal area data can be map data that includes only map elements of a type preset as basic items. The basic items may be the static POI data and the dynamic POI data. Also, the basic items may include the minimal network data required for route calculation to a destination. The minimal network data required for the route calculation to the destination can be, for example, a part or all of the road network data.

In addition, the basic items can include map elements for safety assessment. The map element for safety assessment is a map element useful for the safety assessment unit F71 to calculate a safety distance and a potential accident liability value. The map elements for safety assessment include, for example, road curvature and gradient, road width, number of lanes, and the like. The map elements for safety assessment can also include items indicating traffic rules, such as the speed limit and whether or not the road is a priority road.

Further, the map elements for safety assessment can include stop lines, pedestrian crossings, locations of traffic signals, and the like.

It may be preferable that the normal area data is structured not to include information about more than two landmarks within 30 meters. In other words, the normal area data include information on no more than one landmark (i.e., includes only one landmark) within 30 meters. According to such a configuration, it is possible to further reduce the size of the map data of the normal area.

Figures 16, 17, 18:
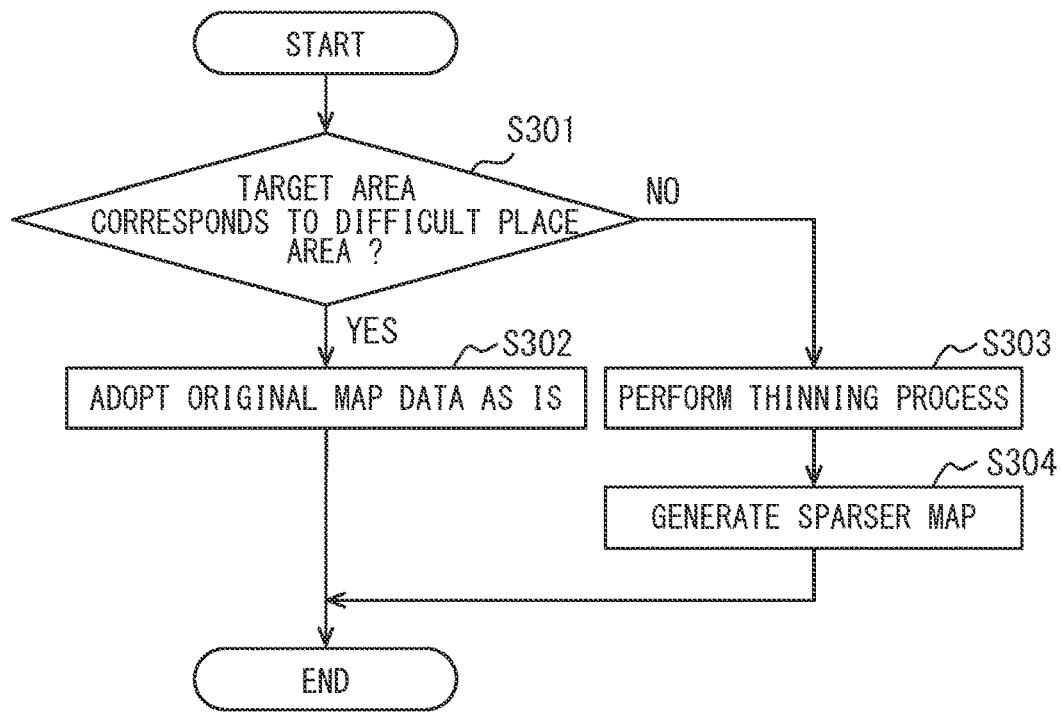
FIG. 16 is a flowchart showing an example of a distribution map creation method.
FIG. 17 is a diagram showing an example of data configuration of the difficult place area data.
FIG. 18 is a diagram showing an example of the data configuration of normal area data.

FIG. 16 is a flowchart showing an example of the operation of the server processor 31 for generating distribution map data for each area. The distribution map generation unit G4 can perform the following processes in order/in parallel for each of a plurality of areas (i.e., map tiles) as distribution units. First, the distribution map generation unit G4 determines whether a target area to be processed corresponds to the difficult place area or to the normal area based on the data stored in the difficult place storage unit 352 (step S301). If the target area corresponds to a difficult place area, the distribution map generation unit G4 adopts the content recorded in the original map data itself as distribution map data (step S302). It should be noted that the distribution map data for the difficult place area may also be not the original map data itself. The process of step S302 may be the same as that of steps S205 and S206. A situation that the target area corresponds to the difficult place area may include a case that a part of the target area corresponds to the difficult place area.

On the other hand, when the target area is a normal area, the distribution map generation unit G4 performs a thinning process to remove unnecessary map elements from the original map data (step S303). The thinning process corresponds to a process of selecting data to be recorded so that the data size is equal to or less than a predetermined value or the data set contains only basic items. Then, the distribution map generation unit G4 generates sparse map data acquired by thinning out unnecessary information as the normal area data (step S304). In such manner, the distribution map for the normal area may be generated based on the original map so that the data size is smaller than the distribution map for the difficult place.

FIG. 17 and FIG. 18 conceptually show an example of configurations of the difficult place area data and the normal area data. The difficult place area data includes, for example, a tile ID field Fd1, a difficult place ID field Fd2, a related tile field Fd3, an in-area number field Fd4, a basic item field Fd5, and an option field Fd6, as shown in FIG. 17.

The tile ID field Fd1 is a data field in which a map tile identification number is stored. ID1 in FIG. 17 represents a number of a map tile. The difficult place ID field Fd2 is a data field in which an identification number and position coordinates assigned to each of the difficult places are stored. ID2 in FIG. 17 represents a difficult place ID, which is an identification number of a difficult place. For example, as shown in FIG. 15, when a plurality of map tiles are set for one difficult place Pd1, those map tiles, in other words, a plurality of data sets for the same difficult place have a common difficult place ID assigned to that same difficult place. By assigning a common difficult place ID to a plurality of data sets, the drive support ECU 20 that receives the data can identify that they are data sets about the common difficult place. The difficult place ID corresponds to identification information of a difficult place. Also, the difficult place ID field corresponds to a first data field.

The related tile field Fd3 is a data field that stores the number and total number of other map tiles related to the subject map tile. For example, as shown in FIG. 15, when a plurality of map tiles are set for one difficult place Pd1 and for one difficult place area Ad1, the related tile field Fd3 stores the total number of map tiles linked to the difficult place and the associated map tile numbers. T.Num in FIG. 17 represents the total number of map tiles linked to the difficult place. As shown in FIG. 15, if a plurality of map tiles are set for one difficult place Pd1 and for one difficult place area Ad1, the in-area number field Fd4 is a data field in which a local number is stored, i.e., a number of a tile in those tile groups. The local numbers refer to "11" to "13", "21" to "23", "31" to "33", and the like in the example shown in FIG. 15. No in FIG. 17 represents a local number.

The basic item field Fd5 is a data field in which the data of the map elements set as the basic item described above is stored. The option field Fd6 is a data field in which map elements other than the basic items are stored. The option field Fd6, in other words, corresponds to a field in which map elements useful for vehicle control, that is, in other words, map elements for difficult places are stored. For example, the option field Fd6 stores the position coordinates of a difficult place, the POI indicating a point at which preparatory control such as lane change and deceleration for the difficult place should be started, and the like. Further, the option field Fd6 can store feature data such as lane markings and landmarks, track determination data, dynamic POIs, and the like. The basic item field Fd5 and the option field Fd6 correspond to a second data field. OBJ in FIG. 17 indicates feature data, and TRJ indicates track determination data.

On the other hand, the normal area data, as shown in FIG. 18, has only a tile ID field Fd1, a difficult place ID field Fd2, a related tile field Fd3, an in-area number field Fd4, and a basic item field Fd5. In other words, the normal area data does not have the option field Fd6. The difficult place ID field Fd2, the related tile field Fd3, and the in-area number field Fd4 in the normal area data may have a bit string which means blank (i.e., so-called NULL).

In such manner, the normal area data has a smaller amount of information than the difficult place area data. In other words, the map data of the normal area has a sparse information density. Also, the difficult place area data is map data with a higher information density than the normal area data. By setting a map area in which the density of the map information to be distributed is sparse according to a predetermined criterion in the map recording area, it is possible to comprehensively reduce the size of the map data used by the vehicle. Also, it is possible to reduce the size of data exchanged in one communication. Note that the map data structure shown in FIGS. 17 and 18 is an example, and can be changed as appropriate. For example, the related tile field Fd3 and the in-area number field Fd4 may be omitted. The above configuration also corresponds to a configuration for distributing a data set including more map elements than the normal area for the difficult place area.

The distribution map generation unit G4 may register, in the distribution map storage unit 353, map tiles from which unnecessary map elements are removed from the original tiles, as distribution map tiles SMT. Unnecessary map elements can be, for example, all map elements in the normal area. A map element that is not set as a difficult place map element in a difficult place area may correspond to an unnecessary map element.

According to such a configuration, it is possible to reduce the size of the distribution map data while using the configuration of the map tiles in the original map data as shown in FIG. 19. According to such a configuration, for example, when the original map data is updated, the updated points can be easily reflected in the distribution map data. The hatched portion of the dot pattern in FIG. 19 represents an area where map elements are densely recorded. In addition, the non-hatched portion conceptually represents a normal area that contains almost no map information. The map server 3 may be configured to generate and distribute map tiles that include a mixture of difficult place areas and normal areas.

Figure 20:
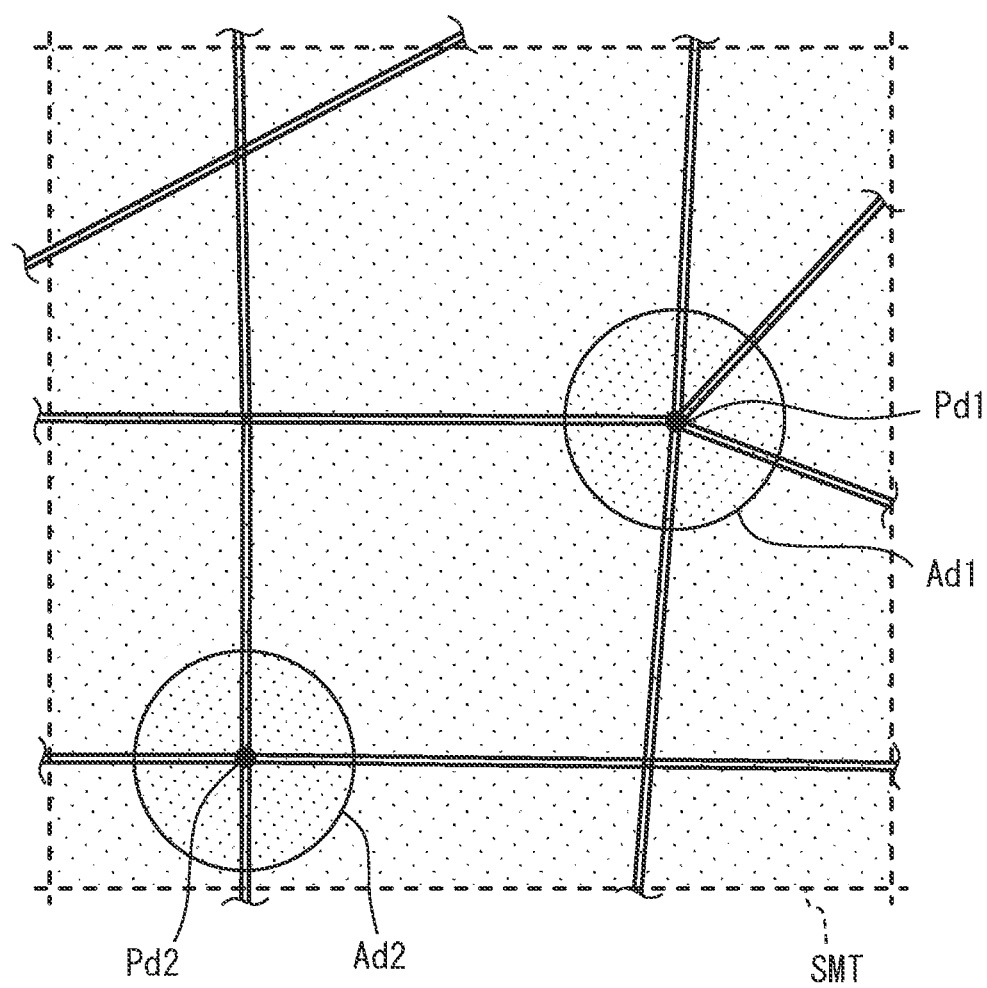
FIG. 20 is a diagram showing another example of configuration of the distribution map data.

Further, the distribution map generation unit G4 may register, in the distribution map storage part 353, the distribution map tiles SMT that contain only basic items for the normal areas while including the same information as the original map for the difficult place areas in the framework of the original tiles OMT. FIG. 20 conceptually shows the distribution map tile SMT. The hatching density in FIG. 20 conceptually indicates the density of the recorded map elements, in other words, the amount of information. Such a map for distribution corresponds to the map data in which the amount of information of a portion corresponding to the normal area is reduced with respect to a portion corresponding to the difficult place area.

Note that a map having a relatively small amount of information compared to an original maps refers to, for example, a map having a small data size per unit area of a real space or per unit road length. Map data with a relatively small data size per unit area or per unit road length is, i.e., represents, for example, a map that records a fewer number of map element types, a map that records a fewer number of features, a map representing a position or a shape of a feature with point groups having larger intervals therebetween. In other words, a map in which part of the information is thinned out corresponds to a map with a relatively small amount of information. The amount of information per unit area can be, for example, the amount of information in a 100 meter square rectangular area. Also, the unit road length can be 100 meters, 200 meters, 500 meters, 1 km, or the like. Note that the data size can be read as the number of bytes or the amount of data.

Even in the normal area, by distributing the basic items, the vehicle can identify the positions of the static POIs and the dynamic POIs. In addition, according to the configuration in which the basic items include the minimal network data for determining a long-term route, a route to the destination can be calculated. Further, if the basic items include traffic rules such as speed limit, overtaking prohibition, and straying prohibition, it becomes possible to assess the safety of a control plan. That is, according to the above configuration, it is possible to reduce the amount of communication related to the use of map data while maintaining typical functions such as safety assessment and the like.

In one aspect, the difficult place setting unit G3 described above corresponds to an area setting unit that divides the map recording area into at least two types of areas, i.e., a highly difficult area and a lowly difficult area, according to a degree of difficulty of performing vehicle control. The lowly difficult area corresponds to the normal area. Further, the difficult place setting unit G3 can be called as a map required area identifying unit that identifies an area requiring the map information for performing a predetermined vehicle control based on a report from the vehicle. In one aspect, the distribution map generation unit G4 can be understood as a map element selection unit that selects the map information required for the target area. Further, in one aspect, the map server 3 described above can correspond to a configuration that selects and distributes only the map information corresponding to the cause of cancellation of vehicle control from the original map data.

Although the embodiments of the present disclosure have been described above, the present disclosure is not limited to the above-described embodiments, and various configurations described below are also included in the technical scope of the present disclosure. Further, various modifications can be made without departing from the scope of the present disclosure. For example, the various configurations described below can be performed in combination as appropriate within a range that does not cause technical contradiction. The members having the same functions as those described in the embodiment described above are denoted by the same reference numerals, and the description of the same members will be omitted. When only a part of a configuration is described, the configuration described in the preceding embodiment can be applied to the rest of the configuration.

Difficult places having dynamic factors such as snow and the like as a reason of difficulty may be periodically checked regarding whether the reason of difficulty still persists based on probe data uploaded from vehicles and weather information acquired from other centers. judge whether Places no longer having reasons of difficulty may be deregistered as difficult places.

In addition, difficult places with static factors such as road structure or the like as a reason of difficulty may also be free from such factors, after renovation of such structure, for example. Therefore, the difficult place setting unit G3 may regularly determine whether the reason of difficulty still persists based on probe data uploaded from the vehicle, road construction information acquired from other centers, and information provided from the map creation vendor. The registration as a difficult place may be cancelled for places where the reason of difficulty has been resolved due to road construction or the like.

For distribution map data including dynamic information such as the dynamic POIs, the content of the data set for distribution may be changed according to changes in the dynamic information. Further, the map data for one difficult place may be divided into a plurality of data sets and distributed while being associated with each other using a difficult place ID or the like. For example, the map data of a point where the factor of the difficult place is a broken-down vehicle can include a map tile including the point where the broken-down vehicle exists and a map tile including the landmark information of, for example, 500 meters this side from (i.e., a front side of) the point of the broken-down vehicle. By distributing the landmark information 500 meters this side from (i.e., a front side of) the vehicle, it becomes possible for the following vehicles to change lanes, etc., in a state where there is sufficient time and distance.

The difficult place setting unit G3 may classify the difficult places into a plurality of levels according to the difficulty levels of the control at the difficult places. For example, the difficulty level can be divided into three levels, 1 to 3, for example. A greater number indicates a higher difficulty level. A point with a difficulty level of 1 can be, for example, a point where the slope changes suddenly or where a sharp curve exists. Also, a relatively small intersection can be set as a difficult place with a difficulty level of 1. A small intersection can be, for example, an intersection where roads with one lane each way connect. A difficult place with a difficulty level of 1 can be, for example, a point at which the probability of control cancellation is 3% or more and less than 10%.

A point with a difficulty level of 2 can be, for example, a connection point between the main line of an expressway and an attached lane, or a medium-sized intersection. A medium-sized intersection can be, for example, an intersection where roads with two to three lanes on both sides of traffic are connected to each other. A difficult place with a difficulty level of 2 can be, for example, a point at which the probability of control cancellation is 10% or more and 25% or less. A point with a difficulty level of 3 can be, for example, a no-lane point, a snow-covered point, a large-scale intersection, or the like. A large-scale intersection can be, for example, an intersection or a multi-way junction where roads with 3 to 4 lanes on both sides are connected to each other. A difficult place with a difficulty level of 3 can be, for example, a point where the probability of control cancellation is 25% or higher.

By classifying the difficult place in such manner, it is possible to define the number of map elements and the amount of data to be included in the distribution map data from a viewpoint of difficulty level. Since it enables identification of high difficulty points, it is possible to propose a route that avoids high difficulty points. Incidentally, the difficulty level for each point may be expressed in five levels from 0 to 4. A point with a difficulty level of 0 corresponds to a point that is not a difficult place.

Various methods can be adopted as the communication procedure between the map server 3 and the vehicle. For example, the vehicle may acquire, from the map server 3, position information of difficult places within a predetermined distance (for example, 1 km) from the vehicle as difficult place list data before acquiring a body of the map data. A difficult place list is acquired from the map server 3 by the map acquisition unit F2 in cooperation with the V2X in-vehicle device 14, for example. Further, when the difficult place list acquired from the map server 3 includes a difficult place that the vehicle is scheduled to pass within a predetermined time, the map acquisition unit F2 may be configured to request the server 3 for the difficult place area data related to the difficult place that the vehicle is scheduled to pass within a predetermined time.

According to the configuration described above, it is possible to download the corresponding map data only when passing through a difficult place. Note that the map acquisition unit F2 may be configured to request the difficult place area data on condition that the remaining distance to the difficult place to be passed is less than a predetermined distance. When the map acquisition unit F2 acquires high difficulty place related area data, the control planning unit F7 may generate a plan for performing a predetermined vehicle control based on the data. For example, when the remaining distance to reach the difficult place becomes equal to or less than a predetermined value, the control planning unit F7 generates a control plan for the difficult place based on the map information stored in the option field Fd6 and the like. The remaining distance can also be replaced with the remaining time.

Further, the map server 3 may push-distribute the map data to predetermined distribution target vehicles. Distribution target vehicles can be selected, for example, based on the current position of the vehicle. Further, the map server 3 may notify the distribution target vehicles about the map information that can be used for control or is useful, and may distribute the map data only to the vehicle that requests for the download of the map information. The setting on the vehicle side regarding whether or not to execute the map information distribution request in response to the notification from the map server 3 may be configured to be changeable by the user. According to such a configuration, it is possible to reduce the possibility that the amount of communication increases against the user's intention. For example, a user who allows cancellation of vehicle control can reduce the amount of communication by setting not to download the map data. On the other hand, a user who does not want cancellation of vehicle control can reduce the risk of vehicle control being cancelled by setting the map data to be actively downloaded.

As for a map data distribution service, a plurality of plans with variations of (a) difficult places to be supported and (b) fees may be prepared. For example, plans A to C may be prepared as fee plans. Plan A corresponds a cheapest plan, with the fewest types of difficult places to which map data is distributed. For example, plan A can be a plan that distributes map data for targets, including gradient change points, sharp curves, and the like. Plan A can also be a plan which supports difficult places with a difficulty level of 1 only.

Plan B is an intermediate plan between Plan A and Plan C. Plan B can be a plan which distributes map data for targets, including small- and medium-sized intersections, in addition to distributing difficult places related data of gradient change points in straight sections and sharp curves. Plan B can be a plan that supports difficult places with a difficulty level of up to 2. Plan C has the highest fee among plans A to C, distributing map data for targets including all kinds of difficult places. Plan C can be a plan that supports difficult places up to a difficulty level of 3.

According to the above configuration, the user can select a plan according to his/her living area or activity range. Note that the above configuration corresponds to a configuration in which more complete map data is distributed to a user who has a contract for a relatively expensive plan than to a user who has a contract for a low-cost plan. It also corresponds to a configuration in which a combination of map data targets, i.e., the types of difficult places and map elements, is changed user to user according to the contract details.

It is expected that the usefulness of map data in vehicle control is difficult for users to imagine. Based on such an assumption, as a map distribution service, users who have selected Plan A or B may be allowed to use Plan C free of charge for the first month. According to such a configuration, the user can experience a difference in vehicle behavior depending on the presence or absence of the map data. In addition, it is possible to make the user realize the usefulness of the map data, and it is possible to increase the user's sense of acceptance or satisfaction with respect to the service fee. It should be noted that the map distribution service may be configured so as to suppress the usage fee of the user by inserting an advertisement. For example, distribution map data may include an advertisement information field, which is a data field into which advertisement information is inserted.

Figure 21:
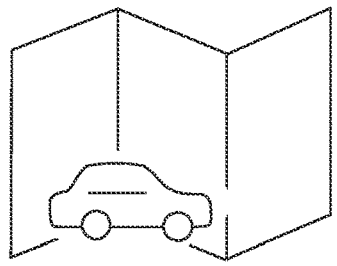
FIG. 21 is a diagram showing an example of an icon image indicating a usage status of the map data.

When driving using the map data acquired from the map server 3, the drive support ECU 20 may display an icon image indicating the usage status of the map data on the display 151 as shown in FIG. 21, for example. Also, at the end of the trip, the number of times the map data has been used may be displayed. The trip here refers to a series of travels from when the power source for traveling the vehicle is turned on and the vehicle starts traveling until the power source for traveling is turned off. According to such a configuration, the user can recognize how much map data is used. As a result, it becomes easier for the user to recognize the usefulness of the map data. As a result, it is possible to increase the user's sense of acceptance or satisfaction with respect to the service fee for using the map. The drive support ECU 20 may be configured to propose a use of high price plan, when (a) the number of times vehicle control is cancelled in one trip is equal to or greater than a predetermined value and (b) there is a higher-grade plan than the plan that the user has contracted.

The user may be billed not for the map distribution service itself, but for a map-linked application, which is an application that performs vehicle control using the map data provided by the map server 3. The map server 3 may be configured to distribute the map data only to users (i.e., vehicles) using a predetermined map-linked application. A map-linked application is, for example, an automatic driving application, an intersection passage support application, an AR (Augmented Reality) navigation application, or the like. The automatic driving application is an application that performs automatic driving within a predetermined operational design domain (ODD) such as on an expressway. As described above, the intersection passage support application is an application that performs vehicle control to support passage through intersections with traffic signals. The AR navigation application is an application that displays an image showing a planned travel route of the subject vehicle, lane markings, and the like so that it overlaps with the actual foreground in cooperation with a head-up display device. Note that the automatic driving application may include an intersection passage support application and an AR navigation application. The map-linked application corresponds to the aforementioned vehicle control application.

Figure 22:
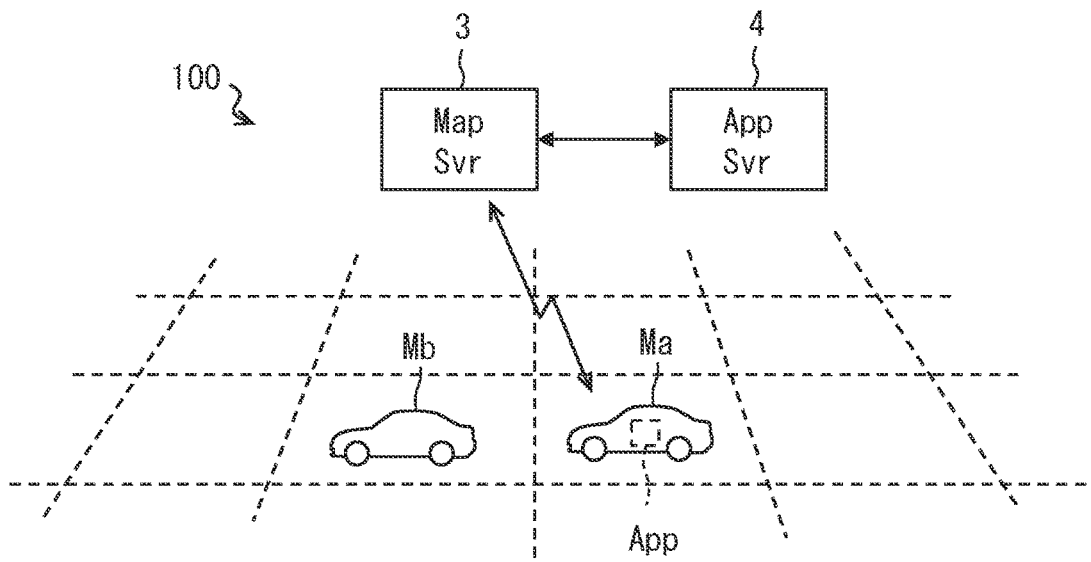
FIG. 22 is a diagram showing another configuration example of the map-linked system.

The map server 3 may be configured to distribute the map data corresponding to the content of the contract/used application only to the user's vehicle Ma in which the above-described map-linked application is installed and the fee corresponding to the content of the contract has been paid. For example, as shown in FIG. 22, the map server 3 acquires information on vehicles using the map-linked application through communication with an application server 4 associated with the map-linked application. In other words, the map server 3 acquires, from the application server 4, the usage status of the map-linked application in each of the plurality of vehicles. Then, to the vehicle Ma in which the map-linked application is used, the map data corresponding to the contract details/billing status and application type is distributed. On the other hand, the map data is not distributed to the vehicle Mb which does not use the map-linked application. In other words, whether or not to distribute map data is switched vehicle to vehicle according to the usage status of the map-linked application. In addition, the distribution processing unit G5 can adjust, according to the billing status/contract plan, the amount of information of the data to be distributed regarding the difficult places. App shown in FIG. 22 indicates a map-linked application.

In such manner, the map server 3 can refrain from distributing the map data to vehicles in which the map-linked application is not used. In addition, the map server 3 can also stop map distribution to vehicles associated with users whose fees are in arrears. It should be noted that the map elements required for performing the application may differ from application to application. Therefore, the map server 3 can generate and distribute the distribution maps for each application. Further, even among the same applications, the information amount (i.e., contents) of the map data to be distributed may differ according to the contract plan as described above. The map server 3 can change the content of distribution according to the usage status/utilization plan of the map-linked application.

Although the mode of controlling map distribution on the side of the map server 3 has been mainly described above, acquisition of the map data can be changed by a user's operation to the drive support ECU 20 as a matter of course. The map acquisition unit F2 is configured to be switchable between execution/stop of data acquisition from the map server 3 according to the operation setting of the map-linked application registered by the user.

Figure 23:
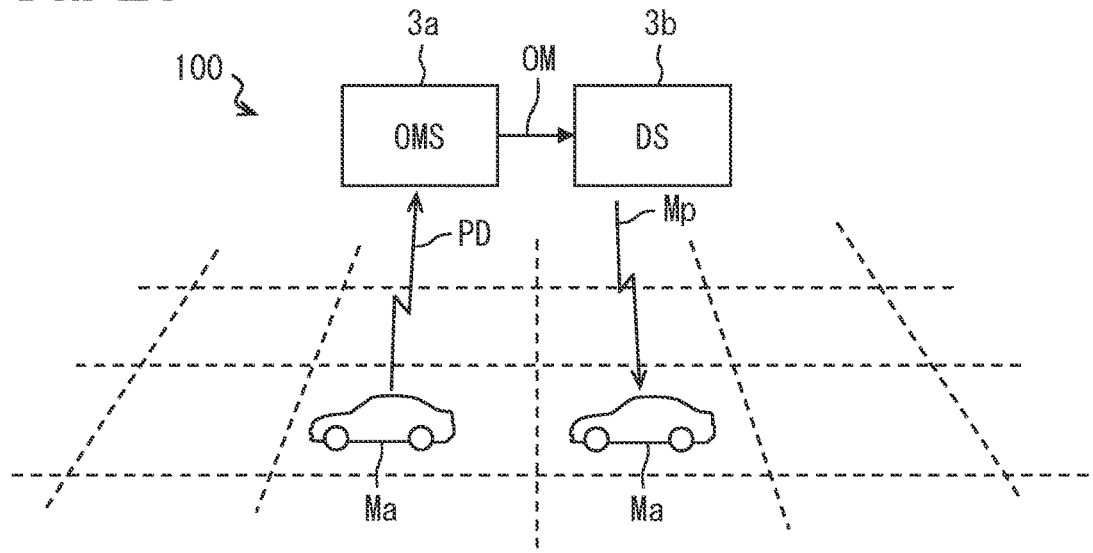
FIG. 23 is a diagram showing yet another configuration example of the map-linked system.

In addition, the above-described map server 3 may be divided and implemented in a plurality of servers. A server for generating and distributing distribution maps and a server for generating and updating original maps may be separately provided. As shown in FIG. 23, the map-linked system 100 may separately include an original map server 3a for generating and updating original maps and a distribution server 3b for generating and distributing distribution maps. In FIG. 23, PD represents probe data, OM represents original map data, and Mp represents distribution map data. Furthermore, a server that generates the distribution map and a server that distributes the distribution map may also be separately provided.

<Appendix 1>

The present disclosure includes the following technical ideas.

(Technical Idea 1)

A map server that distributes map data to a vehicle, includes: a difficult place setting unit that sets a difficult place in performing a predetermined automatic travel control; a distribution map generation unit that generates distribution map data for each area; and a distribution processing unit that performs a process for distributing the map data generated by the distribution map generation unit to the vehicle. In the map server, the map data for a difficult place area, which is an area related to the difficult place, is set to have a greater data amount than the map data for a normal area that is not the difficult place area, in terms of the data amount per unit area size or per unit road length.

(Technical Idea 2)

A map server, including at least one processor, is configured to be capable of: setting a difficult place in performing a predetermined automatic travel control; performing a process of distributing map data for each area to a vehicle based on a request for distribution from the vehicle; and changing a response according to whether or not a requested area of map data requested by the vehicle corresponds to an area related to the difficult place.

(Technical Idea 3)

The map server according to the technical idea 2 is configured in that, when the requested area of map data requested by the vehicle corresponds to the area related to the difficult place, the map data, as a difficult place data set including information on predetermined map elements, is distributed for the vehicle, and when the requested area of map data requested by the vehicle corresponds to a normal area, either (i) a response that does not include the map data or (ii) a data set having an amount of information thinned out to be less than half of the difficult place data set is returned to the vehicle.

<Appendix 2>

The controllers and processors, as well as techniques thereof, described in the present disclosure may be realized by a dedicated computer comprising a processor programmed to perform one or more functions embodied by a computer program. Also, the device and the method therefor which have been described in the present disclosure may also be realized by a dedicated hardware logic circuit. Further, the device and the method therefor which have been described in the present disclosure may also be realized by one or more dedicated computers which are constituted by combinations of a processor for performing computer programs and one or more hardware logic circuits. Further, the computer program may be stored in a computer-readable, non-transitory, tangible recording medium as an instruction executed by a computer. In other words, the means and/or functions provided by the drive support ECU 20 and the like can be provided by software recorded in a physical memory device, a computer performing the software, software only, hardware only, or a combination thereof. For example, some or all of the functions provided by the drive support ECU 20 may be realized as hardware. A mode in which a certain function is realized as hardware includes a mode in which the function is realized by use of one or more ICs or the like. The drive support ECU 20 may be realized using an MPU, GPU, or DFP (Data Flow Processor) instead of the CPU. The drive support ECU 20 may be realized by combining multiple types of arithmetic processors such as a CPU, an MPU, and a GPU. The drive support ECU 20 may be realized as a system-on-chip (SoC). Furthermore, the functions provided by the processor may be realized using an FPGA (Field-Programmable Gate Array) or an ASIC (Application Specific Integrated Circuit). It should be noted that the various programs described above may be stored in a non-transitory, tangible storage medium. Various storage media such as HDD (Hard-disk Drive), SSD (Solid State Drive), EPROM, flash memory, and SD card can be used as a program storage medium.

What is claimed is:

1. A map server for distributing map data to a plurality of vehicles, the map server comprising:
   a report reception unit receiving cancel point reports from the vehicles, each of the cancel point reports being a data set indicative of a point where a predetermined vehicle control for supporting a driving operation by a user or for autonomously driving the vehicle is canceled;
   a difficult place setting unit setting, based on the cancel point reports received by the report reception unit from the vehicles, a difficult place on a map where it is difficult to perform the predetermined vehicle control while maintaining a certain performance level;
   a distribution map generation unit generating distribution map data for each of plurality of areas defined on the map, the plurality of areas including a difficult place area including the difficult place and a normal area that is not the difficult place area; and
   a distribution process unit performing a process for distributing the map data generated by the distribution map generation unit to the vehicles, wherein
   the difficult place setting unit is configured to determine whether a target point is the difficult place based on both a number of receptions of the cancel point reports from the vehicles at the target point and road structure data regarding the target point, and
   the distribution map generation unit is configured to generate, for the difficult place area, as the distribution map data, a data set having a greater amount of data for each unit area or for each unit road length than a data set generated for the normal area,
   wherein
   the vehicles perform the predetermined vehicle control at the difficult place area, using the distribution map data with the data set having the greater amount of data, for supporting the user's driving operation or for autonomously driving the vehicle.

2. The map server according to claim 1, wherein the difficult place setting unit is configured to set, as the difficult place, a point having a predetermined geographical condition that makes execution of the vehicle control difficult.

3. The map server according to claim 1, wherein map elements constitute the map data, and the map data for the difficult place area is set to include more types and/or greater numbers of the map elements than the map data for the normal area.

4. The map server according to claim 1, wherein the map data for the difficult place area includes information on at least two landmarks within 30 meters.

5. The map server according to claim 4, wherein the map data for the normal area includes information on no more than one landmark within 30 meters.

6. The map server according to claim 1, further comprising:
   an original map storage unit storing original map data that represents an original map from which the distribution map data is generated, wherein
   the distribution map generation unit generates a distribution map including a map element required for performing the vehicle control for the difficult place area based on the original map data stored in the original map storage unit.

7. The map server according to claim 1, wherein the difficult place setting unit sets, as the difficult place, at least one of an intersection, a railroad crossing, a gradient change point, a curve, a tunnel exit, a junction on an expressway, a branch point on the expressway, a toll gate on the expressway, a point with a number of past accidents being equal to a predetermined threshold value or more, a no lane marking point where no lane marking is installed, a snow-covered point where a road is covered with snow, and a sand-covered point where the road is covered with sand.

8. The map server according to claim 1, wherein the difficult place setting unit is configured to set, as the difficult place, at least one of (i) an intersection where five or more roads cross and (ii) an intersection where main roads each having a predetermined number of lanes or more cross, and
   the map data for the difficult place area including the intersection set as the difficult place includes at least one of: position information to stop in front of the intersection, position information of a traffic signal installed at the intersection, data directly or indirectly indicating a travel track corresponding to a traveling direction in the intersection, and type and position information of a road marking in the intersection.

9. The map server according to claim 1, wherein the difficult place setting unit is configured to set, as the difficult place, a connection point at which a main line connects with an acceleration lane or a deceleration lane on an expressway, and
   the map data for the difficult place area including the connection point set as the difficult place includes (a) data directly or indirectly indicating a track for changing lanes either from the acceleration lane to the main line or from the main line to the deceleration lane, and (b) information on at least two landmarks in front of the connection point.

10. The map server according to claim 1, wherein the difficult place setting unit is configured to set, as the difficult place, at least one of a no-lane point where no lane marking exists, a snow-covered point where the road is covered with snow, and a sand-covered point where the road is covered with sand, and the map data for the difficult place area including the difficult place includes data indicating positions of division lines and road edges, and information on a plurality of landmarks.

11. The map server according to claim 1, wherein common identification information is given to the map data regarding the same difficult place.

12. The map server according to claim 1, wherein the vehicle control includes at least one of automatic driving, steering support to maintain a traveling lane, lane change to avoid an obstacle or a preceding vehicle, speed adjustment for entering a curve, brake control according to a signaling state of a traffic signal, and support for right turn or left turn.

13. The map server according to claim 1, wherein the distribution map generation unit generates the distribution map data based on original map data including a predetermined item, and the map data for the normal area is a data set acquired by reducing at least part of the original map data.

14. The map server according to claim 1, wherein the distribution processing unit is configured to perform:
acquiring a usage status of an application that performs vehicle control in each of the vehicles; and
determining whether to distribute the map data for each of the vehicles according to the usage status of the application.

15. A map distribution method for distributing map data to a plurality of vehicles, the method, which is performed by at least one processor, comprising the steps of:
receiving cancel point reports from the vehicles, each of the cancel point reports being a data set indicative of a point where a predetermined vehicle control for supporting a driving operation by a user or for autonomously driving the corresponding vehicle is canceled;
setting, based on the cancel point reports received from the vehicles, a difficult place on a map where it is difficult to perform the predetermined vehicle control while maintaining a certain performance level;
generating distribution map data for each of plurality of areas defined on the map, the plurality of areas including a difficult place area including the difficult place and a normal area that is not the difficult place area; and
performing a process for distributing the generated map data to the vehicles, wherein the step of setting the difficult place further includes determining whether a target point is the difficult place based on both a number of receptions of the cancel point reports from the vehicles at the target point and road structure data regarding the target point, and
the step of generating the distribution map further includes generating, for the difficult place area, as the distribution map data, a data set having a greater amount of data for each unit area or for each unit road length than a data set generated for the normal area,
wherein
the vehicles perform the predetermined vehicle control at the difficult place area, using the distribution map data with the data set having the greater amount of data, for supporting the user's driving operation or for autonomously driving the vehicle.

16. A map server for distributing map data to a vehicle, the map server comprising:
a difficult place setting unit setting a difficult place on a map where it is difficult to perform a predetermined vehicle control for supporting a driving operation by a user or for autonomously driving the vehicle while maintaining a certain performance level;
a distribution map generation unit generating distribution map data for a plurality of areas defined on the map, the plurality of areas including a difficult place area including the difficult place and a normal area that is not the difficult area; and
a distribution process unit performing a process for distributing the map data generated by the distribution map generation unit to the vehicle, wherein
the distribution map generation unit is configured to generate, for the difficult place area, as the distribution map data, a data set having a greater amount of data for each unit area or for each unit road length than a data set generated for the normal area,
the map data for the difficult place area includes information on at least two landmarks within 30 meters, and
the map data for the normal area includes information on no more than one landmark within 30 meters,
wherein
the vehicles perform the predetermined vehicle control at the difficult place, using the distribution map data with the data set having the greater amount of data, for supporting the user's driving operation or for autonomously driving the vehicle.

17. A map distribution method for distributing map data to a vehicle, the method, which is performed by at least one processor, comprising the steps of:
setting a difficult place on a map where it is difficult to perform a predetermined vehicle control for supporting a driving operation by a user or for autonomously driving the vehicle while maintaining a certain performance level;
generating distribution map data for each of a plurality of areas defined on the map, the plurality of areas including a difficult place area including the difficult place and a normal area that is not the difficult place area; and
performing a process for distributing the map data generated in the distribution map generation step to the vehicle, wherein
the step of generating the distribution map further includes generating, for the difficult place area, as the distribution map data, a data set having a greater amount of data for each unit area or for each unit road length than a data set generated for the normal area,
the map data for the difficult place area includes information on at least two landmarks within 30 meters, and
the map data for the normal area includes information on no more than one landmark within 30 meters,
wherein
the vehicles perform the predetermined vehicle control at the difficult place, using the distribution map data with the data set having the greater amount of data, for supporting the user's driving operation or for autonomously driving the vehicle.

\* \* \* \* \*